(12) United States Patent
Takeda et al.

(10) Patent No.: US 7,849,703 B2
(45) Date of Patent: Dec. 14, 2010

(54) AIR CONDITIONER FOR VEHICLE

(75) Inventors: Hiroshi Takeda, Nagoya (JP); Hiroyuki Tomita, Nagoya (JP); Yasufumi Kojima, Gifu (JP)

(73) Assignee: Denso Corporation, Kariya (JP)

( * ) Notice: Subject to any disclaimer, the term of this patent is extended or adjusted under 35 U.S.C. 154(b) by 640 days.

(21) Appl. No.: 11/897,221

(22) Filed: Aug. 29, 2007

(65) Prior Publication Data

US 2008/0053128 A1 Mar. 6, 2008

(30) Foreign Application Priority Data

Aug. 31, 2006 (JP) ............................. 2006-234954

(51) Int. Cl.
*B60H 1/32* (2006.01)
*G05D 23/00* (2006.01)

(52) U.S. Cl. .............................. 62/244; 62/161; 62/208; 62/209; 62/239; 700/276; 700/299; 700/300

(58) Field of Classification Search ................. 236/1 C; 62/127, 161, 163, 208, 239, 244, 209; 700/205, 700/276, 299, 300; 702/130
See application file for complete search history.

(56) References Cited

U.S. PATENT DOCUMENTS 4,914,924 A * 4/1990 Takahashi .................... 62/243
5,335,514 A * 8/1994 Hennessee et al. ............ 62/209
6,945,060 B2 * 9/2005 Tomita et al. ................. 62/244
2004/0103675 A1 * 6/2004 Tomita ......................... 62/244

FOREIGN PATENT DOCUMENTS

JP 2003-118348 4/2003

* cited by examiner

*Primary Examiner*—F. Jules
*Assistant Examiner*—Daniel C Comings
(74) *Attorney, Agent, or Firm*—Harness, Dickey & Pierce, PLC

(57) ABSTRACT

In a vehicle air conditioner, when a passenger set temperature of a vehicle compartment is changed through an operation portion by a passenger, a storage portion updates a value of a control set temperature corresponding to a predetermined point of a detection area at a time of the changing operation to a value of the changed passenger set temperature, and stores therein the value of the updated temperature. Furthermore, when the detection point is not any one of the predetermined points, a control portion interpolates and calculates a control set temperature corresponding to the detection point from the control set temperature stored in the predetermined point of the detection area and the control set temperature stored in the predetermined point of a surrounding area around the detection area, and then controls the air-conditioning state in the vehicle compartment based on the interpolated and calculated control set temperature.

16 Claims, 12 Drawing Sheets

AIR CONDITIONER FOR VEHICLE

CROSS REFERENCE TO RELATED APPLICATION

This application is based on Japanese Patent Application No. 2006-234954 filed on Aug. 31, 2006, the contents of which are incorporated herein by reference in its entirety.

FIELD OF THE INVENTION

The present invention relates to a vehicle air conditioner that learns a passenger's favorite set temperature so as to reflect it in air conditioning control.

BACKGROUND OF THE INVENTION

In a vehicle air conditioner as disclosed in JP-A-2003-118348, three environmental conditions of an inside air temperature, an outside air temperature, and an amount of solar radiation are respectively partitioned into predetermined ranges thereby to prepare a three-dimensional map which sets plural areas. A set temperature is stored in each area. Further, in a manual operation of the set temperature by a passenger, the set temperature stored in the area corresponding to the environmental conditions at the time of the operation is modified to a set temperature changed by the passenger, and then the set temperature changed is stored. In this way, the passenger's favorite set temperature is learned.

When performing air-conditioning control in a compartment of a vehicle, an air conditioning controller controls an air-conditioning state in the vehicle compartment by determining a target temperature or the like of conditioned air to be blown into the vehicle compartment using the set temperature stored in the area of the map corresponding to the environmental conditions at the time of air-conditioning control.

In the above-described vehicle air conditioner, however, one set temperature is stored in each of the areas on the map, and the air-conditioning control is performed using the set temperature stored in the area corresponding to the environmental conditions at the time of the air-conditioning control.

When the set temperatures stored in the adjacent areas on the map are different from each other, and the environmental condition is changed to cross a boundary between these adjacent areas in the air conditioning, the air-conditioning state including the air temperature and the like to be blown into the vehicle compartment may change largely. Although the set temperature is learned by the air conditioner, the passenger may disadvantageously feel uncomfortable. This disadvantage would be more remarkable when the difference in set temperature between the adjacent areas is larger.

SUMMARY OF THE INVENTION

The present invention has been made in view of the foregoing problems, and it is an object of the present invention to provide an air conditioner for a vehicle, which can perform control of an air-conditioning state so as not make a passenger feel uncomfortable even upon a change in environmental condition associated with air conditioning.

According to an example of the present invention, an air conditioner for a vehicle includes operation means for changing a passenger set temperature in a vehicle compartment to a value desired by a passenger and storage means for partitioning values of a plurality of environmental conditions associated with air conditioning in the vehicle compartment into predetermined ranges thereby to form a plurality of areas on a multi-dimensional map which handles the values of the plurality of environmental conditions as variables. The storage means is adapted for previously defining one point on the map in each area, as a predetermined point, and for storing therein a control set temperature as a value corresponding to the predetermined point. The air conditioner further includes detection point specifying means for specifying a point on the map defined by detected values of the plurality of environmental conditions as a detection point for the environmental conditions, extraction means for extracting an area including the detection point as a detection area from the plurality of areas, and control means for controlling the air-conditioning state in the vehicle compartment using the control set temperature stored in the storage means. In the air conditioner, when the passenger set temperature is changed by operating the operation means, the storage means updates a value of the control set temperature corresponding to the predetermined point of the detection area at a time of the changing operation to a value of the changed passenger set temperature, and stores therein the value of the updated temperature. Furthermore, when the detection point is not any one of the predetermined points, the control means interpolates and calculates a control set temperature corresponding to the detection point from the control set temperature stored in the predetermined point of the detection area and the control set temperature stored in the predetermined point of a surrounding area around the detection area, and then controls the air-conditioning state in the vehicle compartment based on the interpolated and calculated control set temperature.

Accordingly, the control set temperature reflecting the passenger's preference is stored in the predetermined point in each area on the map of the storage means. Even when the detected value of the environmental condition in the air-conditioning state control in the vehicle compartment is separated from the value of the predetermined point, the control set temperature that corresponds to the environmental condition detected value is interpolated and calculated from the control set temperatures stored in the predetermined points of the plural areas. The interpolated and calculated control set temperature can be used to control the air conditioning in the vehicle compartment.

Thus, in air conditioning of the vehicle compartment, even when the environmental condition changes to cross a boundary between the adjacent areas on the map, the air-conditioning state can be controlled using the interpolated and calculated control set temperature that reflects the passenger's preference according to a change in detected value of the environmental condition. In other words, even when the environmental condition changes to cross a boundary between the adjacent areas with different control set temperatures stored in the predetermined points, the control set temperature changes smoothly, so that the air-conditioning state does not change drastically.

For example, when the detection point is not any one of the predetermined points, the control means interpolates and calculates the control set temperature corresponding to the detection point in every control process cycle for controlling the air-conditioning state in the vehicle compartment thereby to control the air-conditioning state in the vehicle compartment.

Alternatively, the storage means stores the control set temperature interpolated and calculated by the control means on the map. In this case, the control means controls the air-conditioning state in the vehicle compartment based on the control set temperature corresponding to the detection point on the map stored in the storage means when controlling the air-conditioning state in the compartment.

For example, in the air conditioner, the predetermined point may be a center point obtained by combination of respective center values of the plurality of environmental conditions in the area, or may be other predetermined point except for the center point.

The air conditioner may further include passenger identification means for identifying a passenger riding in the vehicle compartment from pre-registered persons who are going to ride therein. In this case, the storage means includes the maps corresponding to the respective persons who are going to ride, and the control means controls the air-conditioning state in the vehicle compartment using the control set temperature of the map corresponding to the passenger identified by the passenger identification means.

The air conditioner may further include display means for receiving input of temperature information output from the control means and for displaying the temperature. In this case, the control means may output the control set temperature stored in the predetermined point of the detection area, or the control set temperature corresponding to the detection point, as the temperature information to the display means. Furthermore, the control means may output the value of the control set temperature stored in the predetermined point of the detection area, or a value of the control set temperature corresponding to the detection point, as the temperature information to the display means in units of resolution previously specified.

BRIEF DESCRIPTION OF THE DRAWINGS

Additional objects and advantages of the present invention will be more readily apparent from the following detailed description of preferred embodiments when taken together with the accompanying drawings. In which:

FIGS. 6A and 6B are diagrams showing part of maps in FIGS. 5A and 5B, in which FIG. 6A shows a learning state of a set temperature, and FIG. 6B shows a state after the learning;

DETAILED DESCRIPTION OF THE PREFERRED EMBODIMENTS

First Embodiment

Figure 1:
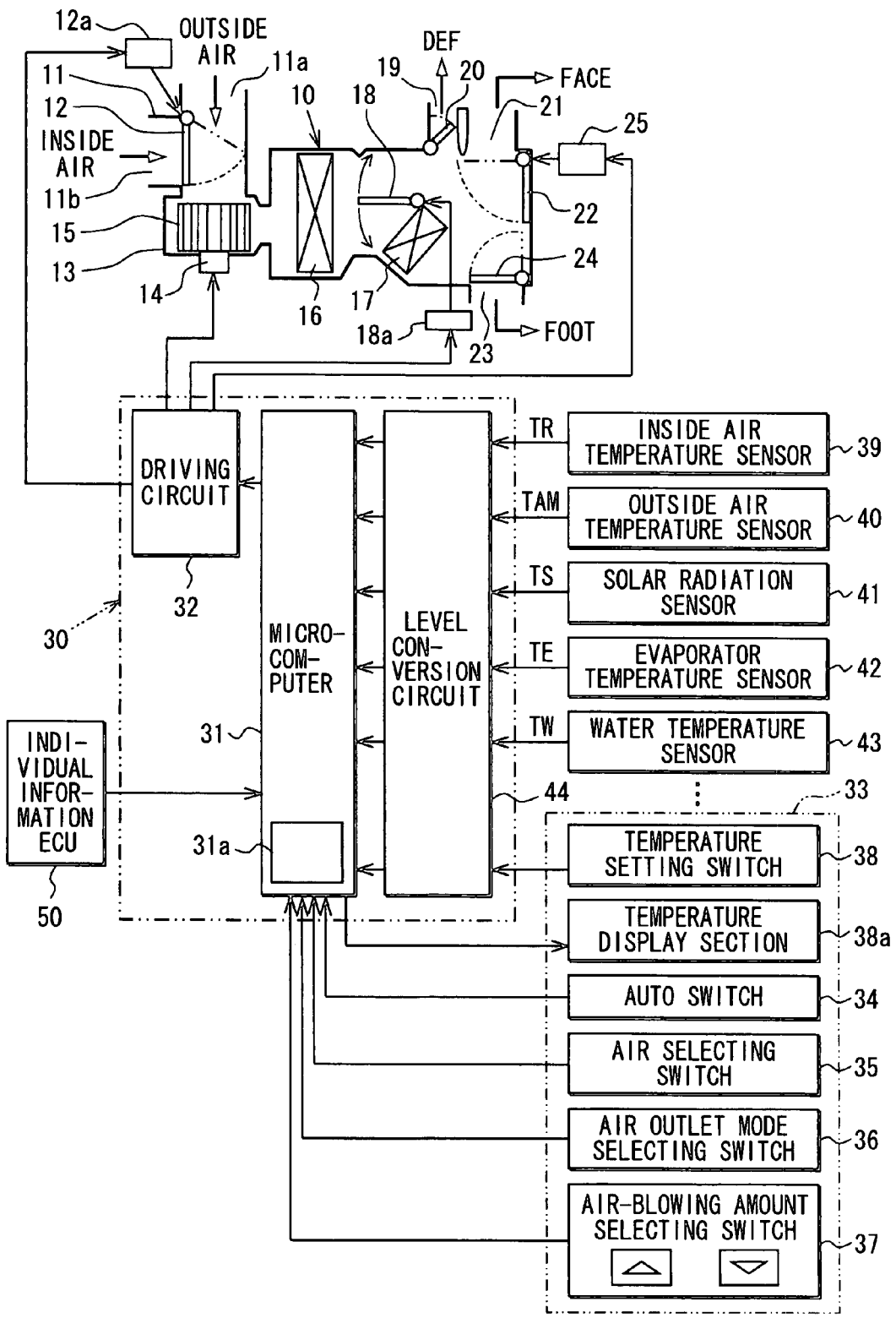
FIG. 1 is a schematic diagram showing a vehicle air conditioner, according to a first embodiment of the present invention.

First, a system structure of a vehicle air conditioner according to a first embodiment of the present invention will be described with reference to FIG. 1.

An air conditioning unit 10 constitutes an indoor unit of a vehicle air conditioner, located inside of a vehicle compartment (e.g., a passenger compartment). An inside/outside air switching box 11 including an outside-air introduction port 11a and an inside-air introduction port 11b is disposed on the most upstream side of an air flow in the air conditioning unit 10. An inside/outside air switching door 12 is rotatably located in the inside/outside air switching box 11.

The inside/outside air switching door 12 is disposed at a branch point between the outside-air introduction port 11a and the inside-air introduction port 11b. The inside/outside air switching door 12 is driven by an actuator 12a to switch the air to be introduced into the air conditioning unit 10 between inside air and outside air, or to adjust a mixing ratio of the inside air to the outside air.

A blower 13 sucks air into the inside/outside air switching box 11, and blows the sucked air toward the downstream side of the air conditioning unit 10. The blower 13 includes a blower motor 14 and a centrifugal blower fan 15 connected to a rotary shaft. An evaporator 16 and a heater core 17 are located on a downstream side of the blower fan 15.

The evaporator 16 is a heat exchanger for cooling, and is connected with a compressor or the like to be driven by a vehicle engine (not shown) to constitute a refrigeration cycle. The evaporator 16 allows low-pressure refrigerant therein to absorb heat from the air and then to evaporate, thereby cooling the air. Here, the low-pressure refrigerant is generally known refrigerant decompressed by a decompressor in the refrigerant cycle. The heater core 17 is a heat exchanger for heating, in which a coolant (hot water) for a vehicle engine (not shown) is circulated as a heat source to heat the air passing through the heater core 17.

An air mix door 18 is rotatably provided as air temperature adjustment means for adjusting the temperature of conditioned air to be blown into the passenger compartment. The air mix door 18 is located on the upstream side of the heater core 17 in the air flow direction. The air mix door 18 is driven by the actuator 18*a* to adjust an opening degree of the air mix door 18. This adjusts the ratio of the air passing through the heater core 17 to the air bypassing the heater core 17, so that the temperature of air blown off into the vehicle compartment is adjusted.

On the most downstream side of the air conditioning unit 10 are provided a defroster door 20 for opening and closing a defroster (DEF) air outlet 19, a face door 22 for opening and closing a face (FACE) air outlet 21, and a foot door 24 for opening and closing a foot (FOOT) air outlet 23.

Each of the doors 20, 22, and 24 constitutes air-outlet mode switching means, which is driven by the actuator 25 to open and close each of the air outlets 19, 21, and 23 thereby to set various air-outlet modes (a face mode, a bi-level mode, a foot mode, a foot/defroster mode, a defroster mode, and the like). The air (conditioned air) whose temperature is adjusted is blown off into the vehicle compartment from at least one air outlet opened according to a set air-outlet mode.

In the face mode, the face air outlet 21 is fully opened, and the defroster air outlet 19 and the foot air outlet 23 are closed, so that the conditioned air is blown off only from the face air outlet 21 to an upper body of the passenger in the vehicle compartment.

In the bi-level mode, the face air outlet 21 and the foot air outlet 23 are fully opened, and the defroster air outlet 19 is closed, so that the conditioned air is blown off from both the face air outlet 21 and the foot air outlet 23 toward the passenger's upper body and feet sides (i.e., upper side and lower side in the vehicle compartment) by the substantially same amount.

In the foot mode, the face air outlet 21 is closed, the foot air outlet 23 is fully opened, and the defroster air outlet 19 is opened by a small opening degree. Thus, while the conditioned air is mainly blown off from the foot air outlet 23 to the passenger's foot side, a small amount of conditioned air is blown from the defroster air outlet 19 toward the inner surface of a windshield in the vehicle compartment.

In the defroster mode, the face air outlet 21 and the foot air outlet 23 are closed, and the defroster air outlet 19 is fully opened, so that the conditioned air is blown off only from the defroster air outlet 19 toward the inner surface of the windshield.

In the foot/defroster mode, the face air outlet 21 is closed, and the defroster air outlet 19 and the foot air outlet 23 are fully opened, so that the conditioned air is blown off from the foot air outlet 23 and the defroster air outlet 19 by the substantially same amount.

An air conditioning controller 30 has a microcomputer 31 serving as control means. The amount of blown air is controlled by adjusting an applied voltage (blower voltage) to the blower motor 14 via a driving circuit 32 based on an output signal from the microcomputer 31 thereby to adjust the number of revolutions of the blower motor 14. It is noted that the other actuators 12*a*, 18*a*, and 25 are also controlled by the driving circuit 32 based on output signals from the microcomputer 31.

The microcomputer 31 includes a central processing unit (CPU) (not shown), a ROM, a RAM, an I/O port, an A/D converter, a stand-by RAM 31*a*, and the like, which are well known.

The stand-by RAM 31*a* constitutes a storage portion (storage means) of this embodiment, and is a RAM for storing (backing up) values learned from the passenger's preference, even when an ignition switch (hereinafter referred to as an IG) for intermittently actuating the vehicle engine is turned off.

Also, when the IG is turned off, an electric power is directly supplied from a battery mounted on the vehicle without via the IG. Furthermore, a power source for backup (not shown) is provided for supplying the power to the microcomputer 31 for a short time even in a state where the electric connection between the microcomputer 31 and the battery is interrupted.

An operation signal is input into the microcomputer 31 from an air conditioning operational unit 33 installed on a dashboard within the vehicle compartment. The air conditioning operational unit 33 includes an auto switch 34 for setting an automatic control condition of the air conditioner, and an inside/outside air selecting switch 35 for manually switching and setting an inside/outside air suction mode. The operational unit 33 also includes a blow-off mode selecting switch 36 for manually switching and setting an air outlet mode, an air-blowing amount selecting switch 37 for manually switching and setting an amount of blown air from the fan 15, and a temperature setting switch 38 for setting a passenger's favorite in-vehicle temperature (set temperature).

In this embodiment, the temperature setting switch 38 serves as an operation portion for the passenger to set a desired condition (desired temperature) of the air-conditioning state in the vehicle compartment. The temperature setting switch 38 permits the passenger to change or adjust the set temperature in the vehicle compartment to a value desired by the passenger. In this example, the desired set temperature can be set by a temperature of 0.5° C., for example.

The air conditioning operational unit 33 is provided with a temperature display section 38*a* serving as a display means for displaying the set temperature. The temperature display section 38*a* receives input of a temperature information signal output from the microcomputer 31, and then displays a numeric value of the temperature.

The microcomputer 31 receives input of signals from various sensors, each serving as environmental condition detecting means for detecting the environmental conditions which may affect the air-conditioning state in the vehicle compartment.

Specifically, an inside air temperature sensor 39 serves as an inside air temperature detecting unit for detecting the temperature of air in the vehicle compartment (inside air temperature) TR. An outside air temperature sensor 40 serves as an outside air temperature detecting unit for detecting the temperature of air outside the vehicle compartment (outside air temperature) TAM. A solar radiation sensor 41 serves as solar a radiation amount detecting unit for detecting an amount of solar radiation receiving in the vehicle compartment TS. An evaporator temperature sensor 42 serves as an evaporator temperature detecting unit for detecting an evaporator temperature (e.g., an evaporator blown-air temperature, post-evaporator air temperature) TE. A water temperature sensor 43 serves as a water temperature detecting unit for detecting a temperature TW of engine-cooling water circulating in the heater core 17. The signal from each of these sensors 39 to 43 is input into the microcomputer 31 via the corresponding level conversion circuit 44, A/D converted and read by and into the microcomputer 31.

Also, a signal from the temperature setting switch 38 is level-converted by the level conversion circuit 44 to be input into the microcomputer 31.

For example, the air-blowing amount selecting switch 37 includes an air-amount up switch and an air-amount down switch. The air-amount up switch outputs a signal for increasing a blower voltage (applied voltage to the motor for driving 14) by one level (0.25 volts) per push. The air-amount down switch outputs a signal for decreasing a blower voltage by one level (0.25 volts) per push.

An individual ID is input from an individual information controller (hereinafter referred to as an individual information ECU) 50 mounted on the vehicle to the microcomputer 31. The individual information ECU 50 identifies a passenger (s) riding in the vehicle compartment among pre-registered persons who are going to get on the vehicle, based on information, including a door unlock key and the like. Then, the ECU 50 outputs individual identification information (individual ID) of the passenger identified via an in-vehicle communication network.

The identification of the passenger by the individual information ECU 50 is based on the information about the door unlock key, but is not limited thereto. The identification of the passenger may be based on, for example, one or a combination of information on an adjusted seat position, on an adjusted steering wheel position, on an adjusted room mirror position, on an image taken by an indoor camera, and a signal or the like input from a passenger identification switch operated by the passenger.

Reference will now be made to an operation of the vehicle air conditioner with the above-mentioned structure according to this embodiment.

Figure 2:
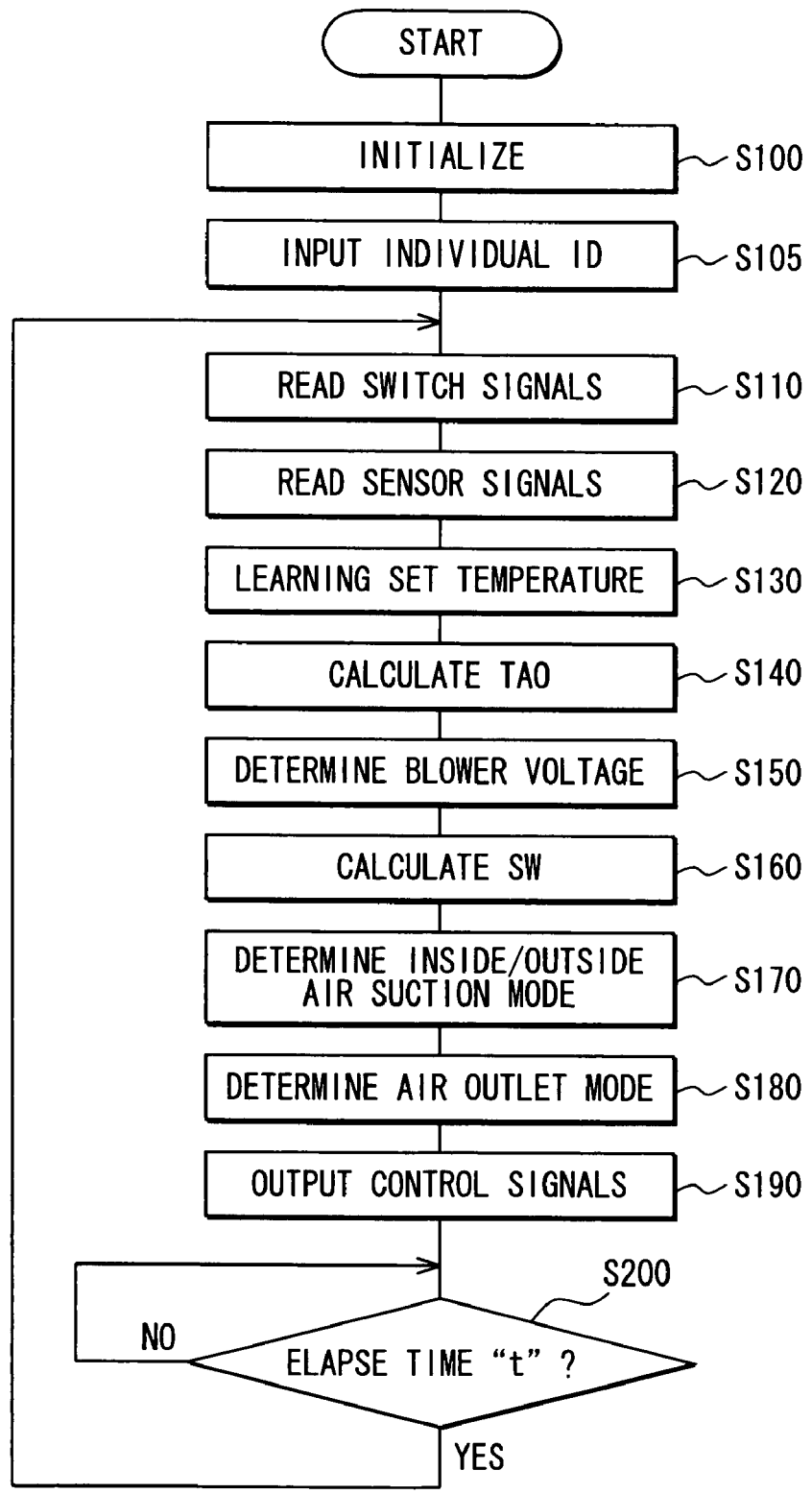
FIG. 2 is a flowchart schematically showing a control operation performed by a microcomputer in the vehicle air conditioner.

FIG. 2 is a flowchart schematically showing a control operation performed by the microcomputer 31. The control shown in FIG. 2 is started upon turning on the IG.

First, in step S100, various conversions, a flag, and the like are initialized. In next step S105, individual identification information is input from the individual information ECU 50 to identify a passenger(s) riding in the vehicle compartment. This step S105 corresponds to passenger identification means of this embodiment for identifying the passenger(s) actually riding (entering) in the vehicle compartment among the pre-registered persons who are going to get on the vehicle.

In step S110, operation signals from various switches 34 to 38 of the air conditioning operational unit 33 are read in. Then, in step S120, sensor detection signals (environmental condition signals) from various sensors 39 to 43 are read in.

When the temperature setting switch 38 is operated to change an inside air temperature to a desired one, a value of a control set temperature TSETc stored in the stand-by RAM 31a is modified and learned to a passenger set temperature TSET changed by the passenger in step S130 (learning step). The details of step S130 will be described later.

In next step S140, a target temperature TAO of air to be blown off into the vehicle compartment is calculated based on the environmental condition signals read in step S120 and the control set temperature TSETc (i.e., the control set temperature) or the like after learning, which is stored in the stand-by RAM 31a. It is noted that the TAO is an air temperature to be blown into the vehicle compartment, which is required to keep the temperature in the vehicle compartment to the control set temperature TSETc, regardless of a change in environmental condition (thermal load condition).

The specific processes in steps S130 and S140 will be described in detail using FIGS. 3 to 12.

Figure 4A:
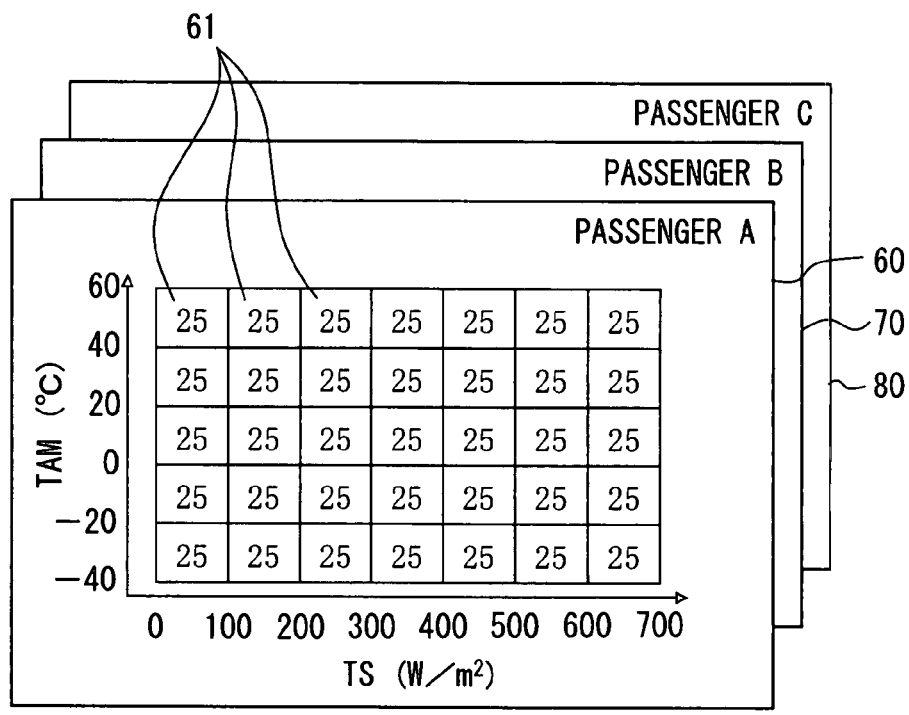
FIGS. 4A and 4B are two-dimensional maps for control set temperatures.
Figure 4B:
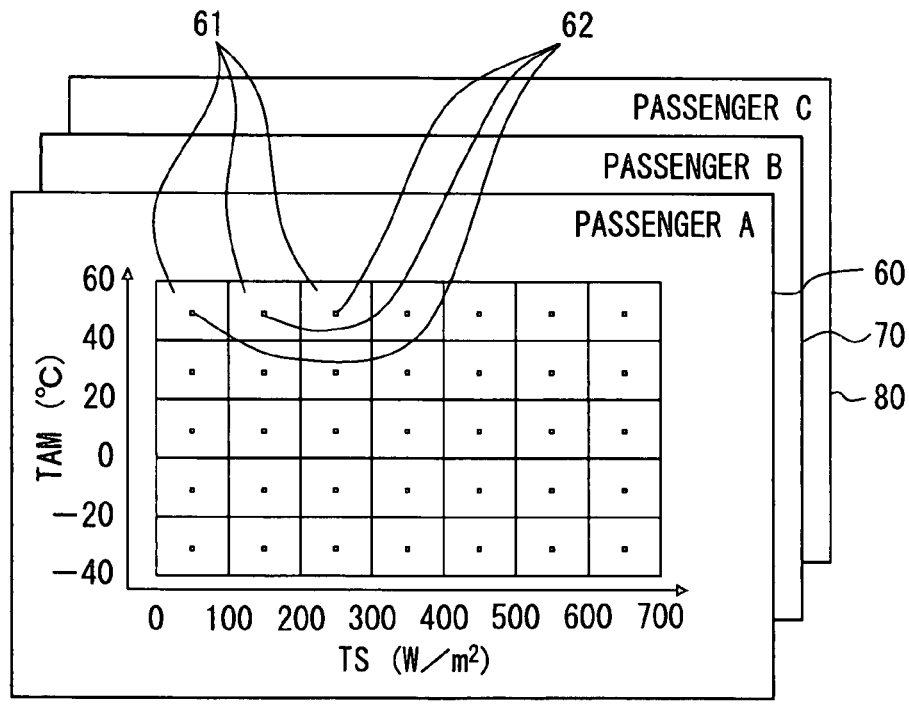

As shown in FIG. 4A, two-dimensional maps 60, 70, and 80 of the control set temperatures TSETc are prepared in the stand-by RAM 31a. In each map, values regarding two environmental conditions of an outside air temperature TAM and an amount of solar radiation TS are respectively partitioned into predetermined ranges thereby to set plural areas 61, and values of the outside temperature TAM and the solar radiation amount TS are respectively handled as variables. In this example, the outside air temperature TAM is partitioned into equal ranges by 20° C., and the amount of solar radiation TS is partitioned into equal ranges by 100 W/m².

The respective maps are actually stored in the form of table in the stand-by RAM 31a, but substantially are stored in the form representing the maps 60, 70, and 80 as shown in FIG. 4A. Thus, these maps 60, 70, and 80 are two-dimensional maps having two environmental conditions, namely, the outside temperature TAM and the amount of solar radiation TS, as parameters on axes.

The maps 60, 70, and 80 respectively correspond to pre-registered passengers A, B, and C who are going to ride in the vehicle. As shown in an example of the map 60 in FIG. 4B, each of the maps 60, 70, and 80 has a control set temperature TSETc stored at a corresponding center point 62 defined by combination of center values (central values) of the two environmental conditions TAM and TS in each area 61. Each area 61 has the center value (for example, 25° C.) of the control set temperature previously stored therein as an initial value.

A map corresponding to the passenger identified in step S105 shown in FIG. 2 is extracted (selected), and then the following control is performed.

Figure 3:
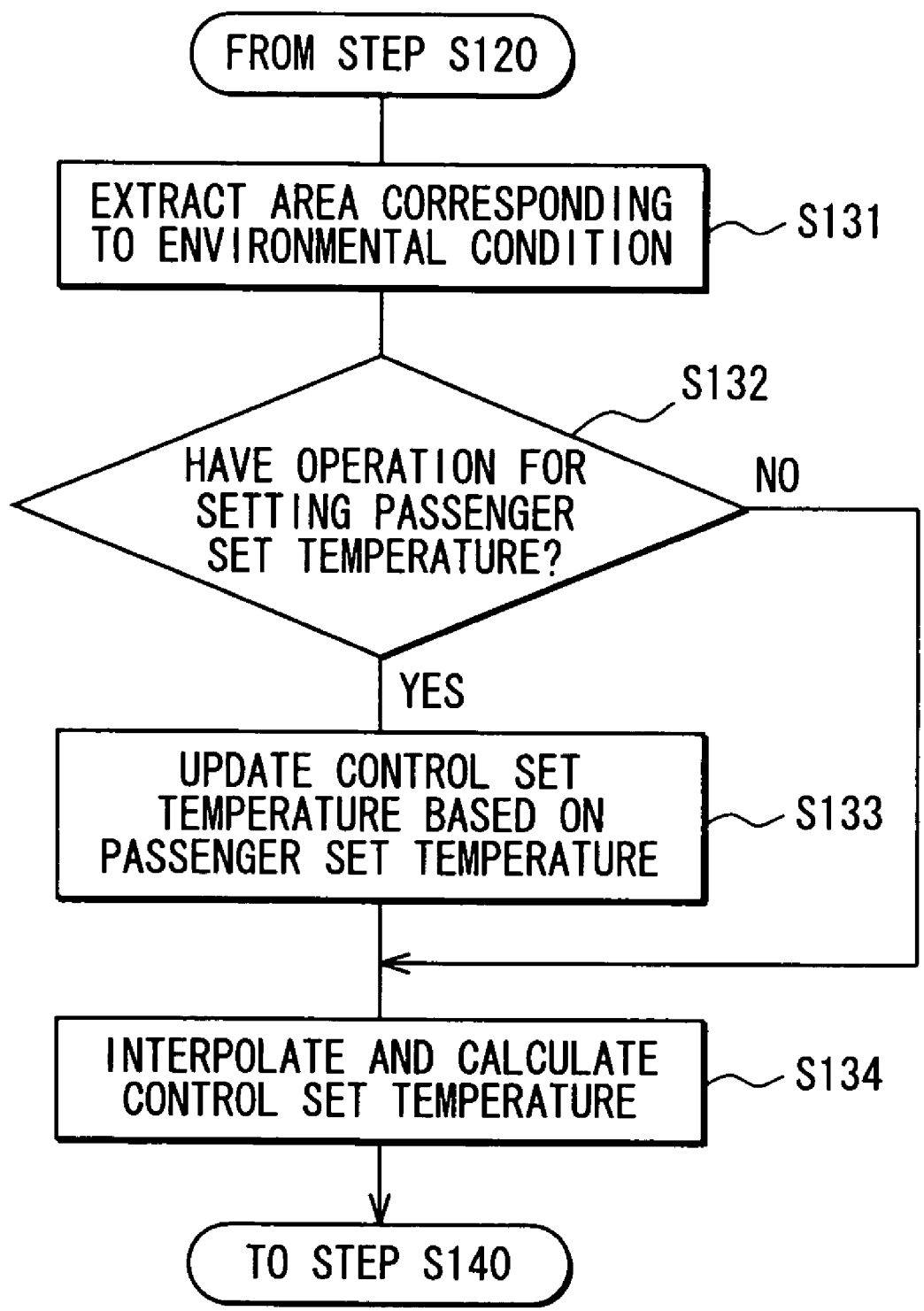
FIG. 3 is a flowchart showing a detail control operation in step S130 shown in FIG. 2, according to the first embodiment.

FIG. 3 is a flowchart showing a control operation in step S130 shown in FIG. 2.

First, in step S131, a point on the map defined by detected values of the outside air temperature TAM and the amount of solar radiation TS is specified as a detection point of the environmental conditions based on environmental condition signals read in step S120. An area including the environmental condition detection point is extracted as a detection area from the plural areas formed on the map.

The step S131 of this embodiment serves as detection point specifying means for specifying the point on the map defined by the detected values of the environmental conditions TAM and TS as the detection point of the environmental conditions. At the same time, the step S131 also serves as extraction means for extracting the area including the detection point specified by the detection specifying means as the detection area from among the areas formed on the map.

After an extraction area corresponding to the environmental condition e.g., TAM and TS is extracted in step S131, it is determined in step S132 whether or not the passenger manually sets (changes) a set temperature (passenger set temperature) based on a switch operation signal read in step S110. When the manual operation of the set temperature is performed by the passenger, i.e., when a passenger set temperature is determined, the procedure proceeds to step S133.

When the manual operation of the set temperature is performed by the passenger, i.e., when a passenger set temperature is determined, the value of the control set temperature TSETc stored in the center point of the detection area extracted in step S131 is updated and modified to a value of a passenger set temperature TSET changed by the passenger. Then, the updated control set temperature TSETc is learned and stored.

Then, the procedure proceeds from step S133 to step S134. When it is determined that the manual operation of the set temperature is not performed by the passenger in step S132, the procedure also proceeds to step S134.

In step S134, the control set temperature TSETc at the detection point of the environmental conditions is interpolated and calculated from the control set temperature TSETc stored in the center point of the detection area including the detection point of the environmental conditions on the map and a control set temperature TSETc stored in a center point of a surrounding area of the detection area.

Figure 5A:
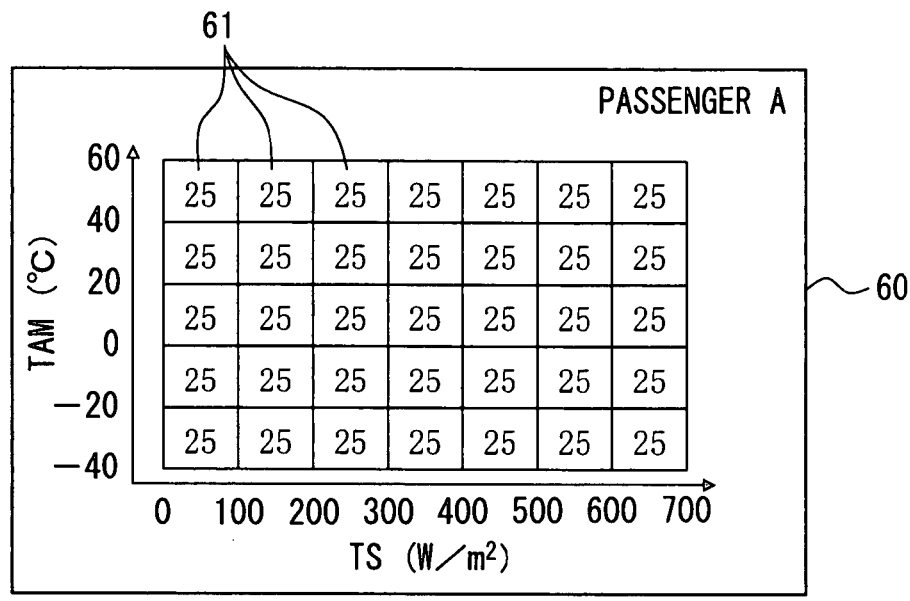
FIGS. 5A and 5B are two-dimensional maps showing a case where a map corresponding to a passenger is selected, according to the first embodiment.
Figure 5B:
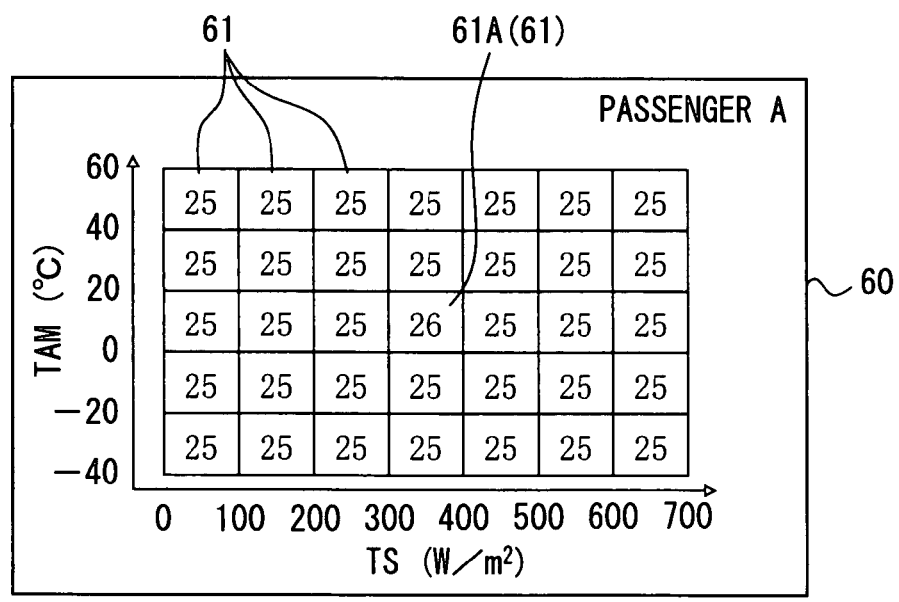

An example of a control operation in steps S131 to S134 will be described below using the accompanying drawings. In step S105, a passenger A is identified from three persons A, B, C who are going to ride in the vehicle. As shown in FIGS. 5A and 5B, this example shows a case where the map 60 corresponding to the passenger A is selected.

Figure 6A:
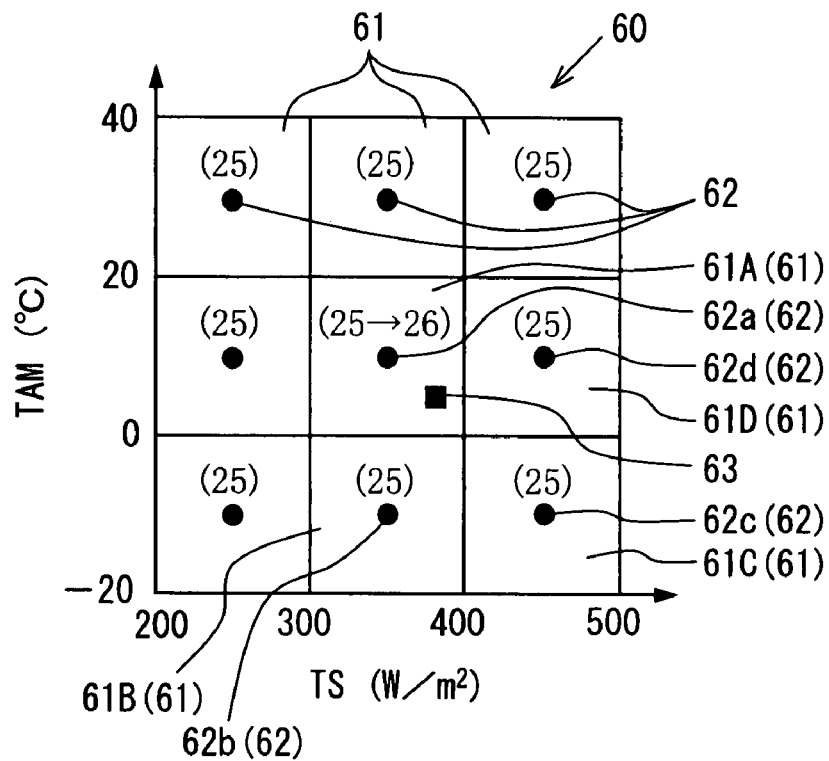
Figure 6B:
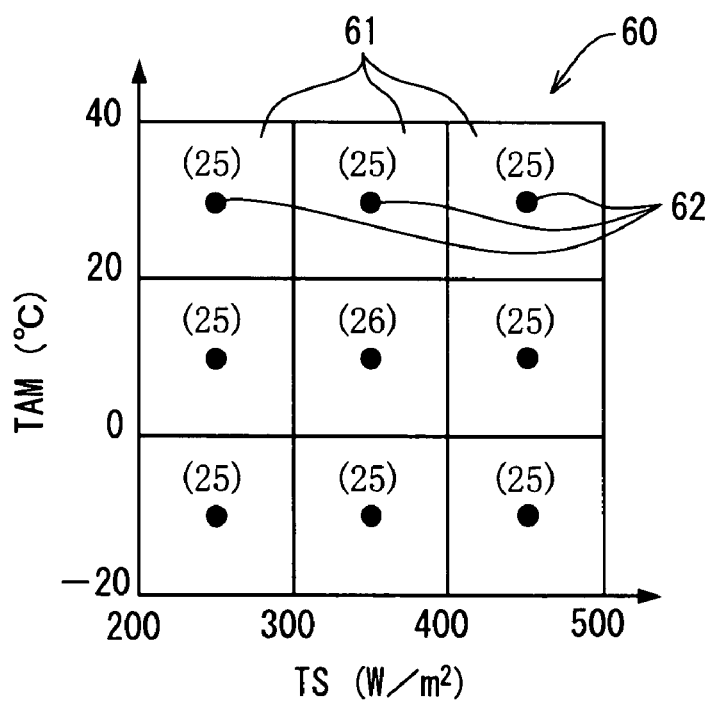
Figure 7:
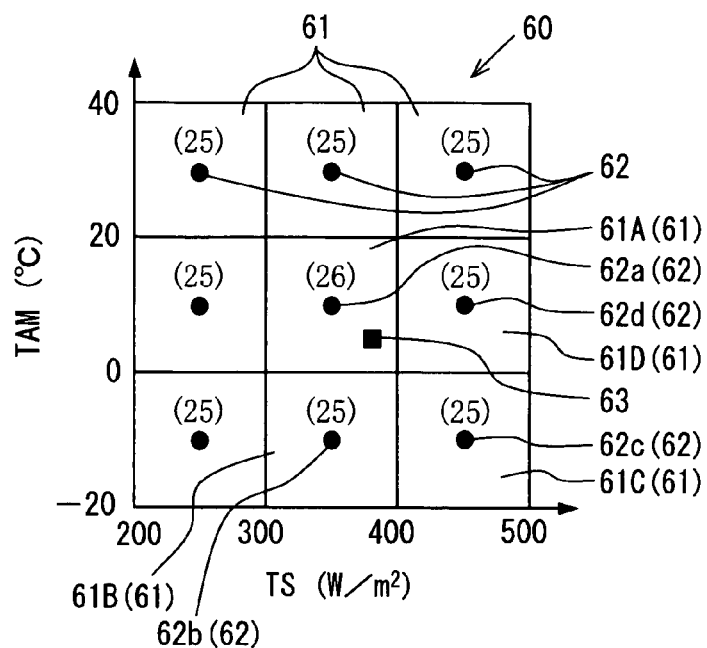
FIG. 7 is a diagram showing a part of maps shown in FIGS. 6A and 6B, for explaining interpolation and calculation of a control set temperature.

FIGS. 5A and 5B are diagrams showing the entire configuration of the map 60. FIGS. 6A, 6B and 7 show parts of the map in FIGS. 5A, 5B.

First, the process of step S131 is performed. When the outside air temperature TAM is determined to be 5° C. and the amount of solar radiation TS to be 380 W/m$^2$ in detection based on the environmental condition signals read in step S120, a detection point 63 is specified and determined on the map 60 as shown in FIG. 6A, and an area including the environmental condition detection point 63 is extracted as a detection area 61A from the plural areas 61 on the map 60.

When it is determined in step S132 that the manual operation of setting the temperature to 26° C. is performed by the passenger, the process of step S133 is performed. As shown in FIG. 6A, the value of the control set temperature TSETc stored in the center point 62a of the extracted area 61A is updated to a value of a passenger set temperature TSET changed by the passenger, that is, 26° C., and the updated set temperature is stored. This provides a map 60 that reflects the learning as shown in FIG. 6B.

The entire map 60 is changed to the map in which the control set temperature TSETc is updated from the state shown in FIG. 5A to the state shown in FIG. 5B.

Then, the process of step S134 is performed. The control set temperature TSETc at the detection point 63 is interpolated and calculated using a membership function based on fuzzy control theory, from the control set temperature TSETc stored in the center point 62a of the detection area 61A on the map 60 and the control set temperatures TSETc stored in the center points 62b, 62c, and 62d of surrounding areas 61B, 61C, and 61D adjacent to the detection area 61A.

For example, the control set temperature TSETc at the detection point 63 is interpolated and calculated using the control set temperatures TSETc stored to correspond to the center point 62a of the detection area 61A, as well as to the center points 62b, 62c, and 62d of the adjacent areas 61B, 61C, and 61D surrounding the detection point 63, while taking into consideration levels of assignment to these four center points 62a to 62d by the membership function (by assigning weights to the control set temperatures TSETc stored in the respective center points 62a to 62d).

Figure 8A:
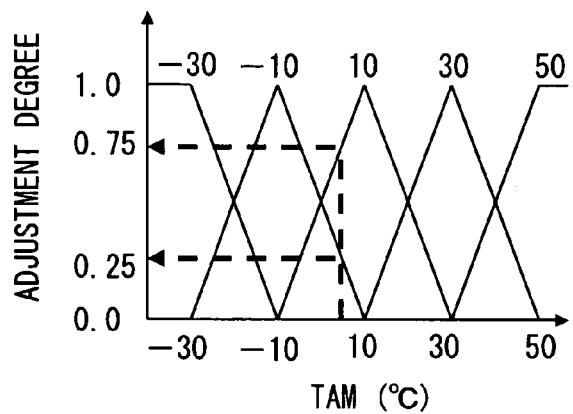
FIG. 8A is a graph showing a membership function (adjustment degree) for an outside air temperature TAM.
Figure 8B:
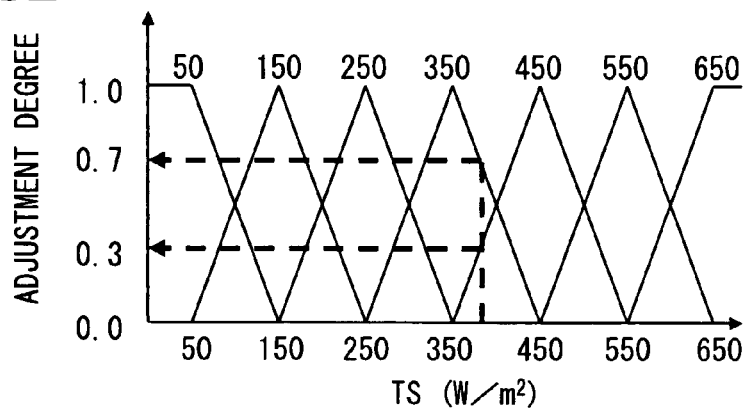
FIG. 8B is a graph showing a membership function (adjustment degree) for a solar radiation amount TS.

For the outside temperature TAM of 5° C. and the amount of solar radiation TS of 380 W/m$^2$ at the detection point 63, like this example, a control set temperature TSETc at the detection point 63 is interpolated and calculated to be 25.525° C., using the membership functions shown in FIGS. 8A and 8B for the outside air temperature TAM and the solar radiation amount TS by the following formula (1).

$$(0.75 \times 0.7 \times 26 + 0.25 \times 0.7 \times 25 + 0.75 \times 0.3 \times 25 + 0.25 \times 0.3 \times 25)/(0.75 \times 0.7 + 0.25 \times 0.7 + 0.75 \times 0.3 + 0.25 \times 0.3)$$
$$= 25.525 (° C.) \quad (1)$$

Figure 9:
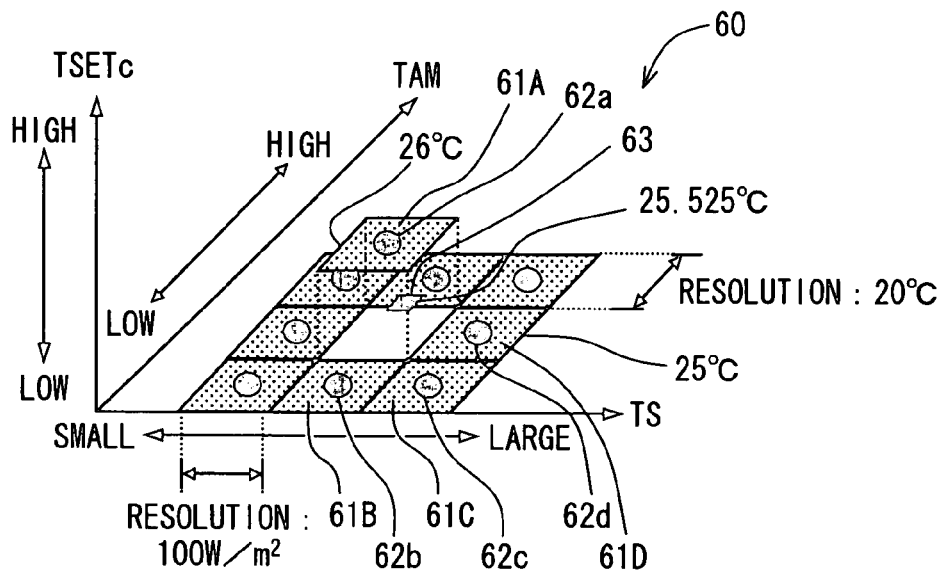
FIG. 9 is a diagram for explaining interpolation and calculation of a control set temperature.

That is, as shown in FIG. 9, the control set temperature TSET at the detection point 63 is determined to be 25.525° C. from a constant table representing the map shown in FIG. 7 (a fuzzy table for the fuzzy control) and the membership function shown in FIGS. 8A and 8B on a smooth curved surface (not shown). The smooth curved surface connects the center point 62a of the detection area 61A and the center points 62b, 62c, and 62d of the adjacent areas 61B, 61C, and 61D.

In execution of the process in step S134, the center point of a surrounding area storing therein a control set temperature TSETc used for the interpolation and calculation of the control set temperature TSETc corresponding to the detection point 63 is appropriately changed to be a center point surrounding the detection point 63, depending on the position of the detection area 61A including the detection point 63.

Figure 10:
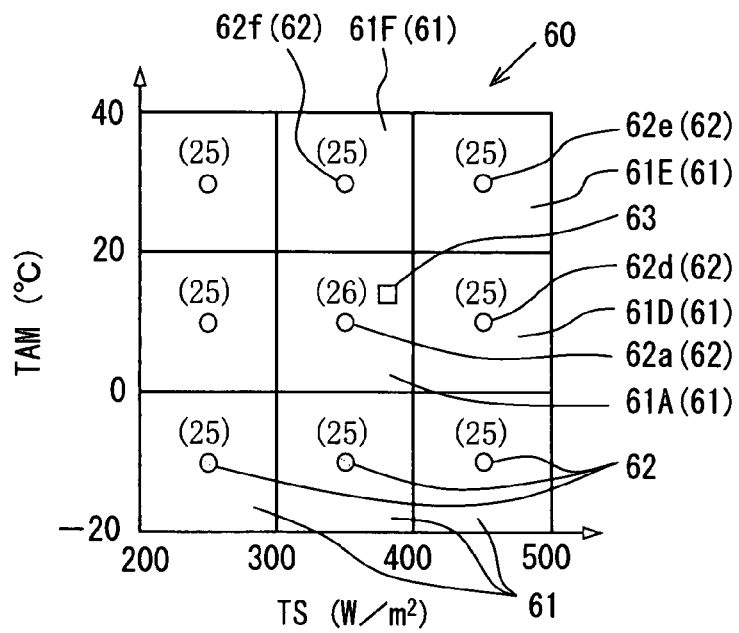
FIG. 10 is a diagram showing a part of maps shown in FIGS. 5A and 5B, for explaining interpolation and calculation of a control set temperature.

For example, when the detection point 63 is located in a position shown in FIG. 10, the control set temperature TSETc at the detection point 63 is interpolated and calculated using the control set temperatures TSETc stored to correspond to the center point 62a of the detection area 61A, as well as center points 62d, 62e, and 62f of the adjacent areas 61D, 61E, and 61F surrounding the detection point 63, while taking into consideration levels of assignment to these four center points 62a, 62d, 62e 62f by the membership function.

Figure 11:
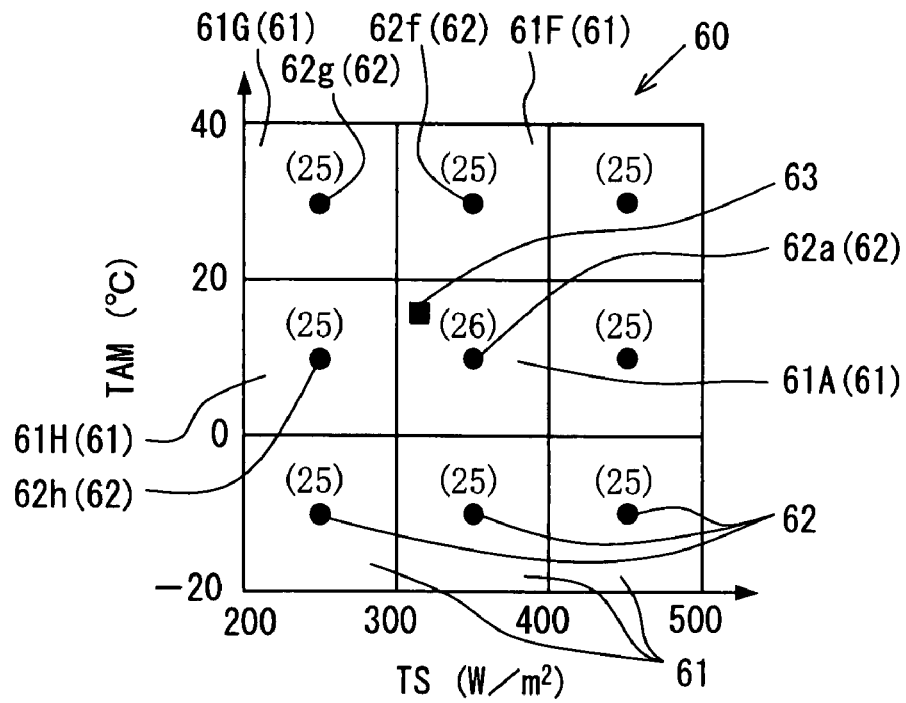
FIG. 11 is a diagram showing a part of maps shown in FIGS. 5A and 5B, for explaining interpolation and calculation of a control set temperature.

For example, when the detection point 63 is located in a position shown in FIG. 11, the control set temperature TSETc at the detection point 63 is interpolated and calculated using the control set temperatures TSETc stored to correspond to the center point 62a of the detection area 61A, as well as center points 62f, 62g, and 62h of the adjacent areas 61F, 61G, and 61H surrounding the detection point 63, while taking into consideration levels of assignment to these four center points 62a, 62f to 62h by the membership function.

Figure 12:
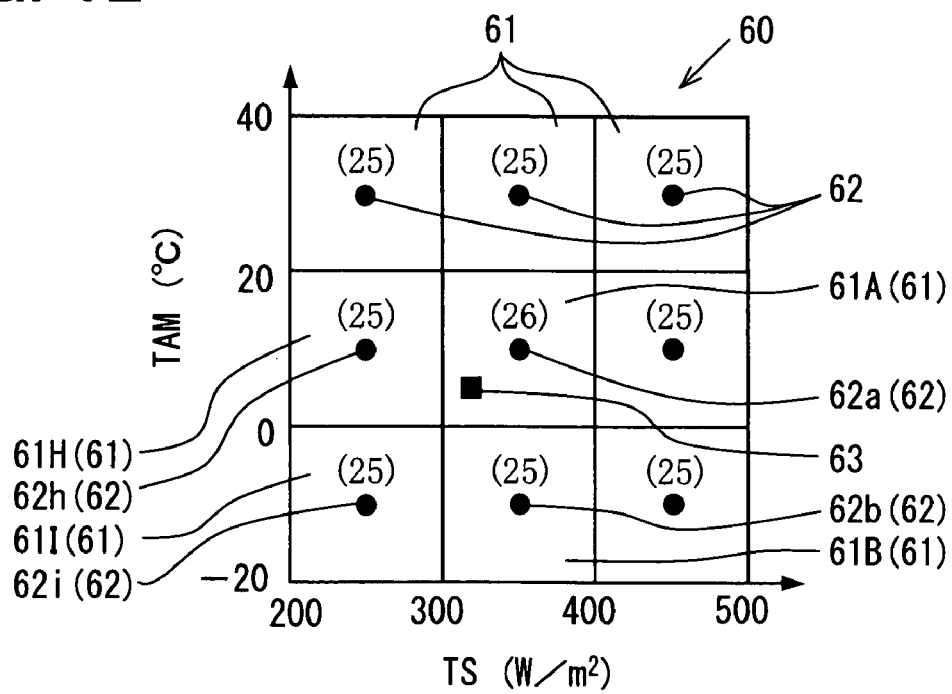
FIG. 12 is a diagram showing a part of maps shown in FIGS. 5A and 5B, for explaining interpolation and calculation of a control set temperature.

For example, when the detection point 63 is located in a position shown in FIG. 12, the control set temperature TSETc at the detection point 63 is interpolated and calculated using the control set temperatures TSETc stored to correspond to the center point 62a of the detection area 61A, as well as center points 62b, 62h, and 62i of the adjacent areas 61B, 61H, and 61I surrounding the detection point 63, while taking into consideration levels of assignment to these four center points 62a, 62b, 62h, and 62i by the membership function.

As mentioned in the above embodiments including the operational example, in step S134, the control set temperature TSETc to be used for calculation of TAO in step S140 is determined.

In performing the process of step S134, when the detection point 63 is identical to the center point 62a, the value of the control set temperature TSETc stored to correspond to the center point 62a is calculated by the membership function based on the fuzzy control theory.

Therefore, in step S134, in a first state where the detection point 63 is identical to the center point 62a, the control set temperature TSETc stored to correspond to the identical center point 62a is calculated. In contrast, in a second state where the detection point 63 is not identical to the center point 62a, the control set temperature TSETc to be used for calculation of the TAO is interpolated and calculated based on the control set temperatures TSETc stored to correspond to the four center points (for example, center points 62a to 62d) surrounding the detection point 62a.

In other words, in step S134, when the detection point 63 is identical to the center point 62a, the control set temperature TSETc stored to correspond to the identical center points 62a is determined as the control set temperature TSETc to be used for calculation of the TAO. In contrast, when the detection point 63 is not identical to the center point 62a, the calculated temperature interpolated from the control set temperatures TSETc stored to correspond to the four center points (for example, the center points 62a to 62d) is determined as the control set temperature TSETc to be used for calculation of the TAO.

Then, the procedure proceeds to step S140, in which the target air temperature TAO is calculated based on the control set temperature TSETc determined in step S134 by the following formula (2):

$$TAO = KSET \times TSETc - KR \times TR - KAM \times TAM - KS \times TS + C \quad (2)$$

where KSET, KR, KAM, KS are coefficients, C is a constant, TSETc, TR, TAM, and TS are a control set temperature, an inside air temperature, an outside air temperature, and an amount of solar radiation, respectively, as mentioned above.

Figure 13:
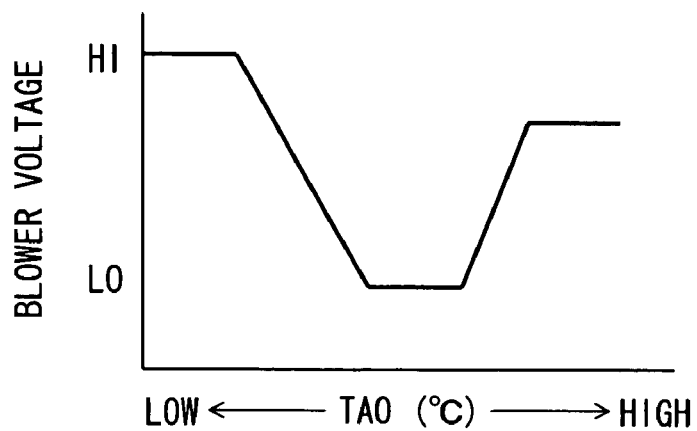
FIG. 13 is a graph for determining a blower voltage based on a target air temperature TAO.

Then, the procedure proceeds to step S150 shown in FIG. 2. A blower voltage for determining the amount of blown air is determined based on the above calculated TAO by control characteristics (map) shown in FIG. 13.

Next, the procedure proceeds to step S160. An opening degree SW of the air mix door 18 corresponding to the calculated TAO is calculated based on the following formula (3).

$$SW=(TAO-TE)/(TW-TE) \times 100 (\%) \quad (3)$$

Figure 14:
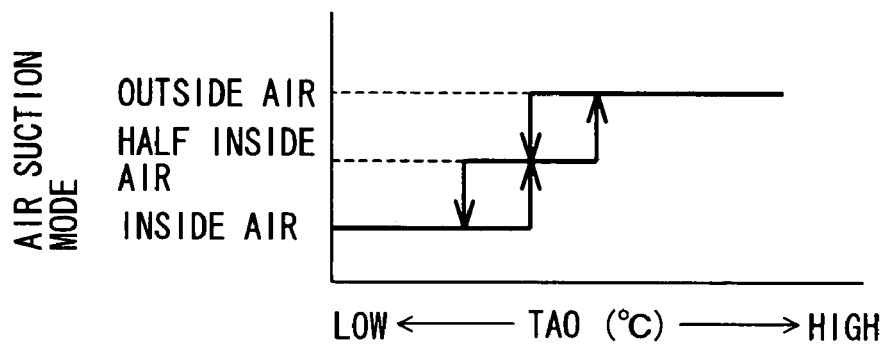
FIG. 14 is a graph for determining an inside/outside air suction mode based on the target air temperature TAO.
Figure 15:
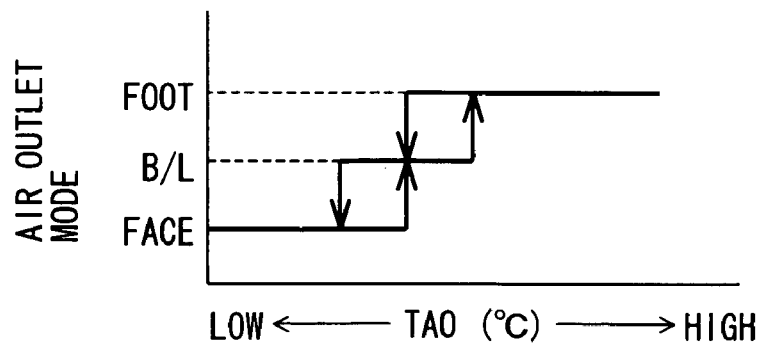
FIG. 15 is a graph for determining an air outlet mode based on the target air temperature TAO.

Then, the procedure proceeds to step S170. The inside/outside air suction mode of the inside/outside air switching door 12 is determined based on the calculated TAO by the control characteristics (map) shown in FIG. 14. Then, the air outlet mode with the blow-off mode doors 20, 22, and 24 is determined based on the calculated TAO by using the control characteristics (map) shown in FIG. 15.

Then, the procedure proceeds to step S190. Various kinds of control signals determined in the above-mentioned steps S150 to S180 are fed to the blower motor 14, and actuators 12a, 18a, 25 via the driving circuit 32 thereby to control the number of revolutions of the blower motor 14 and operations of the actuators 12a, 18a, 25.

In next step S200, it is determined whether or not a control process cycle of "t" seconds has elapsed. When the "t" seconds has elapsed, the procedure returns to step S110, and then the above-mentioned processes will be repeatedly performed.

In this embodiment, the air-blowing amount control (substantially, the blower voltage control), the air temperature control (substantially, the opening degree control of the air mix door 18), the inside/outside air suction mode control, and the air outlet mode control which are described above correspond to the air-conditioning state control.

In execution of the control operation shown in FIG. 2, the microcomputer 31 constantly outputs information about the control set temperature TSETc stored in the center point 62a of the detection area 61A where the detection point 63 of the environmental conditions exists, to the temperature display section 38a as temperature information. The temperature display section 38a displays the temperature information input as the set temperature.

At this time, the microcomputer 31 constantly outputs the value of the control set temperature TSETc stored in the center point 62a of the detection area 61A to the temperature display section 38a as temperature information in units of resolution previously specified (in this example, in display units of 0.5° C. at the temperature display section 38a). The temperature display section 38a displays the temperature information input as the set temperature.

That is, the temperature display section 38a displays not only the value of the control set temperature TSETc to be used for control of the air-conditioned state, but also the value of the control set temperature TSETc stored to correspond to the center point 62a of the detection area 61A in display units of 0.5° C.

According to the above-mentioned structure and operation, the stand-by RAM 31a of the air conditioning controller 30 includes the plural areas 61 partitioned on the two-dimensional map 60 using values of the outside air temperature TAM and the amount of solar radiation TS as variables. The stand-by RAM 31a stores the control set temperature TSETc as a value corresponding to the center point 62 for every area 61 formed, and performs learning of the control set temperature TSETc for every center point 62 of each area 61.

When the detection point 63 defined by the outside air temperature TAM and the amount of solar radiation TS is identical to the center point 62a of the detection area 61A, the microcomputer 31 calculates the target air temperature TAO based on the control set temperature TSETc stored to correspond to the center point 62a thereby to control the air-conditioned state. When the detection point 63 with the environmental conditions of the outside air temperature TAM and the amount of solar radiation TS is not identical to the center point 62a of the detection area 61A, the microcomputer 31 interpolates and calculates the control set temperature TSETc corresponding to the detection point 63 based on the control set temperatures TSETc stored to correspond to the center points of the detection area 61A and the adjacent areas thereto, and then calculates the target air outlet temperature TAO thereby to control the air-conditioned state.

That is, one control set temperature TSETc is stored to correspond to the center point 62 of each area 61 on the map 60 in the stand-by RAM 31a. Even when the detection point 63 defined by the outside air temperature TAM and the amount of solar radiation TS is separated from the center point 62a of the detection area 61A in control of the air-conditioning state in the vehicle compartment (regardless of existence of the detection point 63 at the center point 62a), the air conditioning can be controlled in the vehicle compartment as follows. The control set temperature TSETc corresponding to the detection point 63 is interpolated and calculated from the control set temperatures TSETc stored to correspond to the center point 62a and the center points of the surrounding areas. The thus-obtained control set temperature TSETc interpolated can then be used to control the air conditioning in the vehicle compartment.

In an air conditioning of the vehicle compartment, even when at least one of the outside air temperature TAM and the amount of solar radiation TS changes so as to cross a boundary between the adjacent areas 61 on the map 60 (even when the detection area 61A is moved to the neighboring area), the air-conditioning state can be controlled as follows. That is, the control set temperature TSETc is interpolated and calculated so as to reflect the passenger's preference according to a change in detected value of the environmental condition, and can be then used to control the air-conditioned state.

In other words, even when the detection point 63 defined by the detected values of the outside air temperature TAM and the amount of solar radiation TS moves a boundary partitioned between the adjacent areas 61 with the different control set temperatures TSETc stored in the respective center points 62, the following effect will be obtained. Since the control set temperature TSETc changes smoothly and not drastically across the boundary, this control arrangement can prevent the passenger from feeling uncomfortable due to a drastic change in air-conditioned state.

The air conditioning controller 30 interpolates and calculates the control set temperature TSETc corresponding to the detection point to control the air-conditioning state in the vehicle compartment in every control process cycle for controlling the air-conditioning state inside the compartment using a routine shown in FIG. 2. That is, the control set temperature TSETc corresponding to the detection point 63 is interpolated and calculated in every control process cycle for controlling the air-conditioning state in the compartment. Thus, the stand-by RAM 31a of the air conditioning controller 30 may store therein the control set temperature TSETc only in the center point of each area on the map, which can reduce an increase in storage capacity required for the stand-by RAM 31a.

In a comparative vehicle air conditioner, one set temperature is stored in each area of the map. When different environmental conditions belong to the same area at the time of the air conditioning control, the same set temperature is used in either condition to control the air conditioning.

When the environmental condition in which the passenger manually changes the set temperature differs relatively largely from the environmental condition in which the air conditioning is performed in the same area, the comparative vehicle air conditioner may disadvantageously make the passenger feel uncomfortable, although the control set temperature is learned.

In order to solve this problem, the following means has been proposed. The environmental condition is further partitioned into smaller areas, which results in an increase in number of the areas, each of which becomes smaller. This reduces a margin of separation in the same area between the environmental condition, where the passenger manually changes the set temperature, and the environmental condition, where the air conditioning is controlled. The use of this means may disadvantageously increase the storage capacity required for storage means of the air conditioning controller.

In contrast, the structure and operation of this embodiment can use as the control set temperature TSETc in control of the air-conditioning state in the vehicle compartment, an interpolated and calculated temperature that reflects the passenger's preference depending on a change in detected value of the outside air temperature TAM and the amount of solar radiation TS even in the same area partitioned on the map 60. In other words, the air conditioning control can be performed according to the passenger's preference without further partitioning the area 61 of the map 60 into smaller areas and increasing the number of partitioned areas.

This can prevent the passenger from feeling uncomfortable upon a change in environmental condition in the same area on the map without increasing the storage capacity of the stand-by RAM 31*a*.

In this way, even upon a change in environmental condition associated with air conditioning, the air-conditioning state control can be provided for preventing the passenger from feeling uncomfortable. Together with this, since the passenger hardly feels uncomfortable, the frequency of intricate operations of the temperature setting switch 38 can be decreased.

A passenger riding in the vehicle compartment is specified from plural pre-registered persons who are going to ride therein. A map corresponding to the riding passenger is selected from the two-dimensional maps 60, 70, 80. The air-conditioning state control can be performed based on the set temperature that is learned by the selected map and which reflects the passenger's preference.

This can provide the air-conditioning state control which does not allow any pre-registered persons, who are going to ride, to feel uncomfortable. Furthermore, since preparation for maps which are assigned to all persons who are going to ride tends to increase storage capacity required for the stand-by RAM 31*a*, this effect of reducing the increase in required storage capacity is very great without increasing the storage capacity for the map.

The microcomputer 31 interpolates and calculates the control set temperature TETc based on the fuzzy control theory. Thus, the interpolated temperature between the center points can be calculated easily with high accuracy.

The maps 60, 70, and 80 are two-dimensional maps, each handling two environmental conditions, that is, values of the outside air temperature TAM and the amount of solar radiation TS as variables. This can surely reduce the increase in storage capacity required for the stand-by RAM 31*a*, as compared to the use of a three- or more dimensional map which handles three or more values of the environmental conditions as variables.

Further, the two environmental conditions on the axes of the map are the outside air temperature TAM and the amount of solar radiation TS, which are apt to vary according to the passenger's preference for the set temperature TSET. Accordingly, even the use of the two-dimensional map can easily prevent the passenger from feeling uncomfortable.

The stand-by RAM 31*a* stores therein the control set temperature TSETc corresponding to the center point 62 of each area 61 on the map. This can reduce a margin of separation (maximum degree of separation) in the same area between the center point 62 corresponding to the storage of the control set temperature TSETc and the detection point 63 of the environmental conditions in execution of the air conditioning control. Thus, the air-conditioned control can be easily provided with high accuracy for reflecting the passenger's preference for the set temperature TSET over the entire same area.

The temperature display section 38*a* constantly displays the control set temperature TSETc stored to correspond to the center point 62*a* of the detection area 61A including the detection point 63 of the environmental conditions. Thus, during the air conditioning control, even when the detection point 63 of the environmental conditions changes in the same area and thus the control set temperature TSETc changes, the set temperature displayed by the temperature display section 38*a* does not change. Furthermore, when the detection point 63 of the environmental conditions moves to an adjacent area, the temperature displayed by the temperature display section 38*a* is then changed to a set temperature TSET stored to correspond to the center point 62*a* of the adjacent area after movement.

That is, the temperature display section 38*a* constantly displays the set temperature TSET stored to correspond to the center point 62*a* of the detection area 61A. Thus, since the displayed temperature does not change frequently, the passenger can easily confirm the control set temperature TSETc. Moreover, when the detection point 63 moves over the boundary between the areas, the passenger realizes easily that the control set temperature TSETc is learned.

The temperature display section 38*a* can display the temperature in units of resolution previously specified (in this example, in display units of 0.5° C. at the temperature display unit 38*a*), which permits the passenger to easily realize the control set temperature TSETc.

Second Embodiment

Now, a second embodiment of the present invention will be described in detail with reference to FIGS. 16 and 17.

In the first embodiment as described above, the control set temperature TSETc corresponding to the detection point 63 is interpolated and calculated in every control process cycle for controlling the air-conditioned state. The second embodiment differs from the first embodiment in that a control set temperature TSETc is previously interpolated, calculated and stored.

The same parts of the second embodiment as those of the first embodiment are designated by the same reference numerals, and a description thereof will be omitted below.

Figure 16:
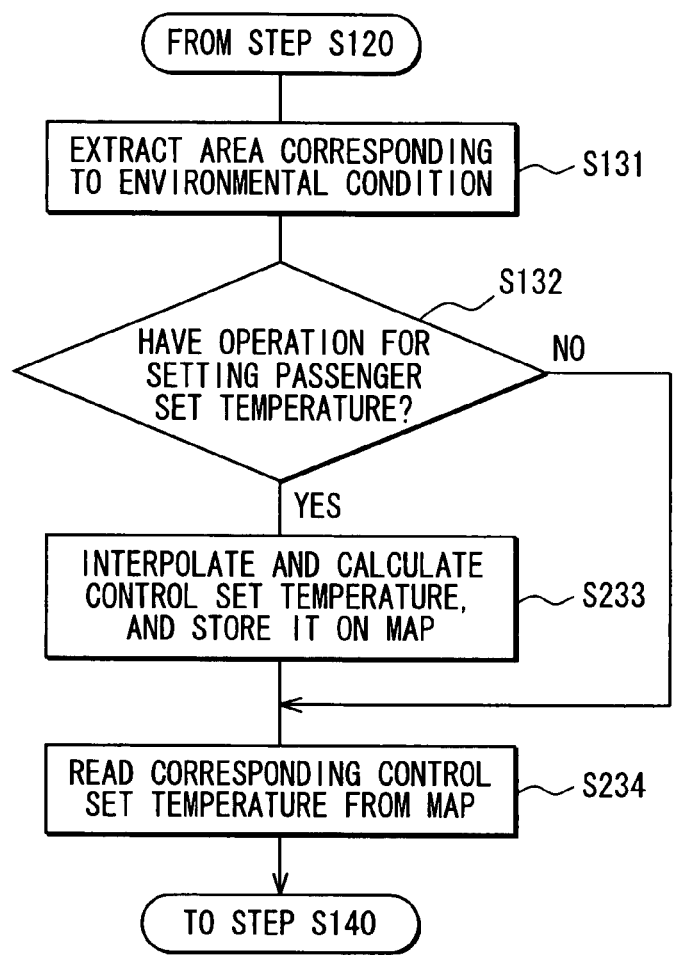
FIG. 16 is a flowchart showing a detail control operation in step S130 shown in FIG. 2, according to a second embodiment of the present invention.

FIG. 16 is a flowchart showing a control operation in step S130 shown in FIG. 2. Referring to FIG. 16, in this embodiment, when it is determined that the manual operation of a set temperature is performed by the passenger in step S132, the value of the control set temperature TSETc stored in the center point 62a of the extraction area 61A extracted in step S131 is updated to a value of a passenger set temperature TSET changed by the passenger. In this way, the control set temperature TSETc is modified and learned to be stored.

Furthermore, the control set temperature TSETc is interpolated and calculated between the center points from the control set temperature TSETc stored in the center point 62a of the detection area 61A including the detection point 63 of the environmental conditions on the map and a control set temperature TSETc stored in a center point of a surrounding area around the detection area. The interpolated and calculated set temperature TSETc is also modified and learned to be stored on the map.

After execution of step S233, the procedure proceeds to step S234. Alternatively, also when it is determined that the manual operation of the setting temperature is not performed by the passenger in step S132, the procedure proceeds to step S234.

In step S234, the control set temperature TSETc corresponding to the detection point 63 of the environmental conditions detected by the step S131 is read from the control set temperatures TSETc stored on the map. Then, in step S140, a control set temperature TSETc to be used for calculation of the TAO is determined.

An example of a control operation shown in FIG. 16 will be described below with reference to the accompanying drawings. Like the first embodiment, in this example, a passenger A is identified from three persons A, B, and C who are going to ride in the vehicle in step S105, and a map 60 corresponding to the passenger A is selected.

Figure 17:
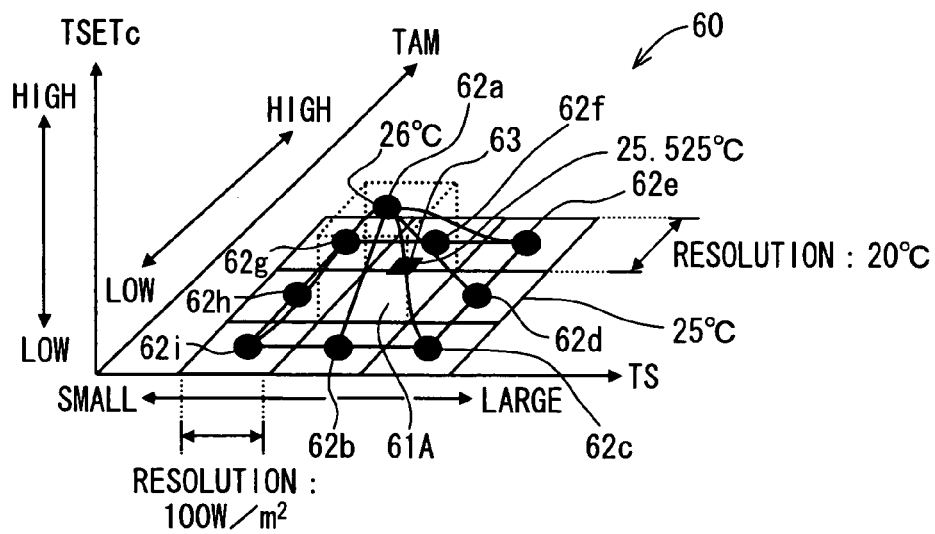
FIG. 17 is a diagram showing a part of a map, for explaining interpolation and calculation of a control set temperature and storing operation thereof, according to the second embodiment.

FIG. 17 shows a main configuration of the map 60.

First, the process in step S131 is executed. A detection point 63 is specified on the map 60 based on environmental condition signals read in step S120. An area including the detection point 63 of the environmental conditions is extracted as a detection area 61A from the plural areas 61 on the map 60.

When it is determined that the passenger manually changes the set temperature, for example, from 25° C. to 26° C. in step S132, the process in step S233 is executed. As shown in FIG. 17, the value of the control set temperature TSETc stored in the center point 62a of the extraction area 61A is updated to 26° C., which is a passenger set temperature TSET changed by the passenger. This temperature is then stored.

Additionally, a control set temperature TSETc between center points is interpolated and calculated using a membership function based on fuzzy control theory from the control set temperature TSETc stored in the center point 62a of the detection area 61A on the map 60 and the set temperatures TSETc stored in center points 62b to 62i of areas 61B to 61I around and adjacent to the detection area. Updating is performed on the map 60 using the above interpolated control set temperature TSETc, which is then stored.

In FIG. 17, reference numerals for the areas 61B to 61I are omitted.

Specifically, a control set temperature TSETc in a range surrounded by the center points 62a to 62d is interpolated and calculated using the membership function based on the fuzzy control theory from the following set temperatures for control. These temperatures are the control set temperature TSETc stored in the center point 62a of the detection area 61A on the map 60 as explained in the first embodiment using FIGS. 6 and 7; and the control set temperatures TSETc stored in the center points 62b, 62c, 62d of the areas 61B, 61C, 61D around and adjacent to the detection area. Updating is performed using the above interpolated control set temperature TSETc, which is then stored.

A control set temperature TSETc in a range surrounded by the center points 62a, and 62d to 62f is interpolated and calculated using the membership function based on the fuzzy control theory from the following set temperatures for control. These temperatures are the control set temperature TSETc stored in the center point 62a of the detection area 61A on the map 60 as explained using FIG. 10; and the control set temperatures TSETc stored in the center points 62d, 62e, 62f of the areas 61D, 61E, 61F around and adjacent to the detection area. Updating is performed using the above interpolated control set temperature TSETc, which is then stored.

A control set temperature TSETc in a range surrounded by the center points 62a, and 62f to 62h is interpolated and calculated using the membership function based on the fuzzy control theory from the following set temperatures for control. These temperatures are the control set temperature TSETc stored in the center point 62a of the detection area 61A on the map 60 as explained using FIG. 11; and the control set temperatures TSETc stored in the center points 62f, 62g, 62h of the areas 61F, 61G, 61H around and adjacent to the detection area. Updating is performed using the above interpolated control set temperature TSETc, which is then stored.

A control set temperature TSETc in a range surrounded by the center points 62a, 62b, 62h, and 62i is interpolated and calculated using the membership function based on the fuzzy control theory from the following set temperatures for control. These temperatures are the control set temperature TSETc stored in the center point 62a of the detection area 61A on the map 60 as explained using FIG. 12; and the control set temperatures TSETc stored in the center points 62b, 62h, 62i of the areas 61B, 61H, 61I around and adjacent to the detection area. Updating is performed using the above interpolated control set temperature TSETc, which is then stored.

After execution of the process in step S233 in this way, a new map 60 is provided in which any control set temperature TSETc in a range surrounded by the center points 62a to 62i on the map 60 is represented on a smooth curved surface that reflects the learning, as shown in FIG. 17 (in other words, the map 60 is updated).

In execution of the process in step S234, a control set temperature TSETc corresponding to the detection point 63 of the environmental conditions is read from the smooth curved surface (from among points on the curved surface) on the map 60 shown in FIG. 17.

FIG. 17 illustrates an example of the detection point 63 in which the outside air temperature TAM is 5° C. and the amount of solar radiation TS is 380 W/m$^2$. As shown in FIG. 17, like the first embodiment, the control set temperature is determined to be 25.525° C.

According to the above-mentioned structure and operation, the stand-by RAM 31a includes the plural areas 61 partitioned on the two-dimensional map 60 handling values of the outside air temperature TAM and the amount of solar radiation TS as variables. When the passenger changes the set temperature, the air conditioning controller 30 updates the value of the control set temperature TSETc corresponding to the center point 62a of the environmental condition detection area 61A to a value of the passenger set temperature TSET changed by the passenger. In addition, the air conditioning controller 30 also performs updating of a value of the control set temperature TSETc interpolated and calculated between the center point 62a of the detection area 61A and the center point of the surrounding area.

In execution of the air conditioning control in the vehicle compartment, the control set temperature TSETc corresponding to the detection point 63 of the environmental condition is read from the control set temperatures TSETc stored on the map 60, and is then used for calculation of the target air temperature TAO.

In other words, every time the controller learns the passenger's preference, the control set temperature TSETc between the center point 62a of the detection area 61A and the center point of the surrounding area is interpolated, calculated, and then updated. In the air conditioning control, the control set temperature TSETc stored to correspond to the detection point 63 is read out.

In the air conditioning of the vehicle compartment, even when at least one of the outside air temperature TAM and the amount of solar radiation TS changes so as to cross a boundary between the adjacent areas 61 on the map 60, the air-conditioning state can be controlled as follows. That is, the control set temperature TSETc is interpolated, calculated, and stored so as to reflect the passenger's preference according to a change in detected value of the environmental condition, and can be then used to control the air-conditioned state.

In other words, even when the detection point 63 defined by the detected values of the outside air temperature TAM and the amount of solar radiation TS moves to cross the boundary between the adjacent areas 61 with the different control set temperatures TSETc stored in the respective center points 62, the following effect will be obtained. Since the control set temperature TSETc changes smoothly and not drastically across the boundary, this arrangement can prevent the passenger from feeling uncomfortable due to a drastic change in air-conditioned state.

In the controlling of the air-conditioning state in the vehicle compartment, the interpolated and calculated temperature reflecting the passenger's preference according to a change in detected value of the outside air temperature TAM and the amount of solar radiation TS can be used as the control set temperature TSETc even in the same area partitioned on the map 60.

In this way, even upon a change in environmental condition associated with air conditioning, the air-conditioning state control can be provided for preventing the passenger from feeling uncomfortable. Together with this, since the passenger hardly feels uncomfortable, the frequency of intricate operations of the temperature setting switch 38 can be decreased.

The stand-by RAM 31a stores the control set temperature TSETc interpolated and calculated by the microcomputer 31 on the map. The microcomputer 31 controls the air-conditioning state in the vehicle compartment based on the control set temperature TSETc corresponding to the detection point 63 on the map stored in the stand-by RAM 31a in the control of the air-conditioning state in the vehicle compartment. Thus, the control set temperature TSETc does not need to be interpolated and calculated in every control process cycle for controlling the air-conditioning state in the vehicle compartment, which can reduce a process burden on the microcomputer 31.

Other Embodiments

Although the present invention has been fully described in connection with the preferred embodiments thereof with reference to the accompanying drawings, it is to be noted that various changes and modifications will become apparent to those skilled in the art.

For example, in each of the above-mentioned embodiments, the control set temperature TSETc is interpolated and calculated between the center point 62a of the detection area 61A for the environmental conditions and the center point of the surrounding area adjacent to the detection area 61A, the present invention is not limited thereto. For example, a control set temperature TSETc may be interpolated and calculated between the center point 62a of the detection area 61A and a center point of a surrounding area apart from the detection area 61A.

A range of areas of interest for interpolating and calculating the control set temperature TSETc, including the detection area (a degree of separation from the detection area) may be changed according to a degree of change in passenger set temperature TSET changed by the passenger. Alternatively, a range of areas of interest for interpolating and calculating the control set temperature TSETc, including the detection area, (a degree of separation from the detection area) may be changed according to the degree of separation between a value of the passenger set temperature TSET changed by the passenger (that is, a changed value of the center point 62a of the detection area 61A) and the value of the center point of the area adjacent to the detection area 61A.

For example, when the passenger changes the set temperature by 5° C. or more, or when a set temperature changed differs from a set temperature stored in the center point of any one of adjacent areas to the detection area by 5° C. or more, a control set temperature TSETc may be interpolated and calculated between the center point of the detection area and a center point of an outer area outside the adjacent area to the detection area. In addition, when the passenger changes the set temperature by 8° C. or more, or when a set temperature changed differs from a set temperature stored in the center point of any one of the adjacent areas to the detection area by 8° C. or more, a control set temperature TSETc may be interpolated and calculated with a center point of a further outer area.

In one specific example, in the first embodiment, when the detection point 63 is directed to the center point 62c side (right lower side in the figure) away from the center point 62a in the detection area 61A as shown in FIG. 6A, the control set temperature TSETc is interpolated and calculated between the center point 62a of the detection area 61A and the center points 62b to 62d of the areas 61B to 61D adjacent to the detection area 61A.

Figure 18:
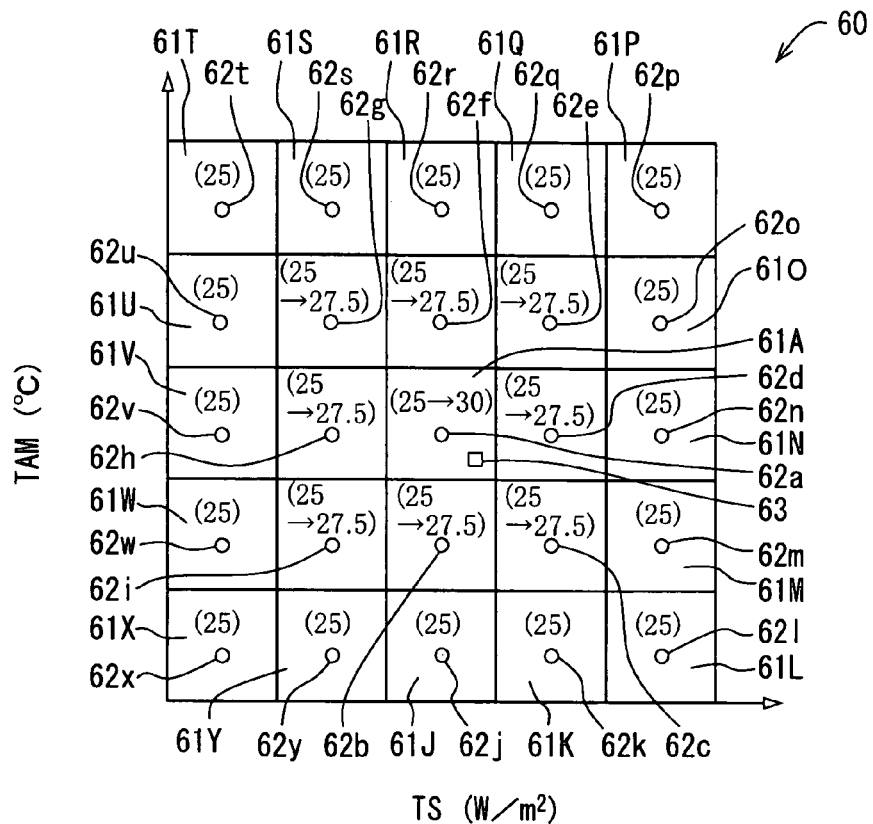
FIG. 18 is a diagram showing a part of a map, for explaining interpolation and calculation of a control set temperature, according to the other embodiment.

In contrast, for example, as shown in FIG. 18, when the set temperature at the center point 62a is updated to be increased by 5° C. or more (5° C. in an example shown in FIG. 18), a control set temperature TSETc may be interpolated and calculated between the center point 62a of the detection area 61A and center points 62j, 62l, 62n of areas 61J, 61L, 61N apart from the detection area 61A via the adjacent areas thereto (areas adjacent to the outer periphery of the adjacent areas).

At this time, values of control set temperatures TSETc corresponding to center points 62b to 62d located among the four center points 62a, 62j, 62l, 62n used for the above interpolation and calculation may be preferably interpolated, calculated, and then updated. Furthermore, the same interpolation and calculation is preferably performed three times among the center points 62a, 62n, 62p, and 62r, among the center points 62a, 62r, 62t, and 62v, and among the center points 62a, 62v, 62x, and 62j. Thus, values of control set temperatures TSETc corresponding to the center points 62e to 62i may be preferably interpolated, calculated, and updated.

In the example shown in FIG. 18, the control set temperatures TSETc corresponding to the center points 62b to 62i are changed by the above-mentioned updating.

In another specific example of the second embodiment, in updating of the set temperature TSETc corresponding to the center point 62*a* of the detection area 61A as shown in FIG. 17, the control set temperature TSETc is interpolated and calculated between the center point 62*a* of the detection area 61A and the center points 62*b* to 62*i* of areas 61B to 61I (not shown in FIG. 17) adjacent to the area 61A. In this way, the control set temperature TSETc stored on the map is updated.

Figure 19:
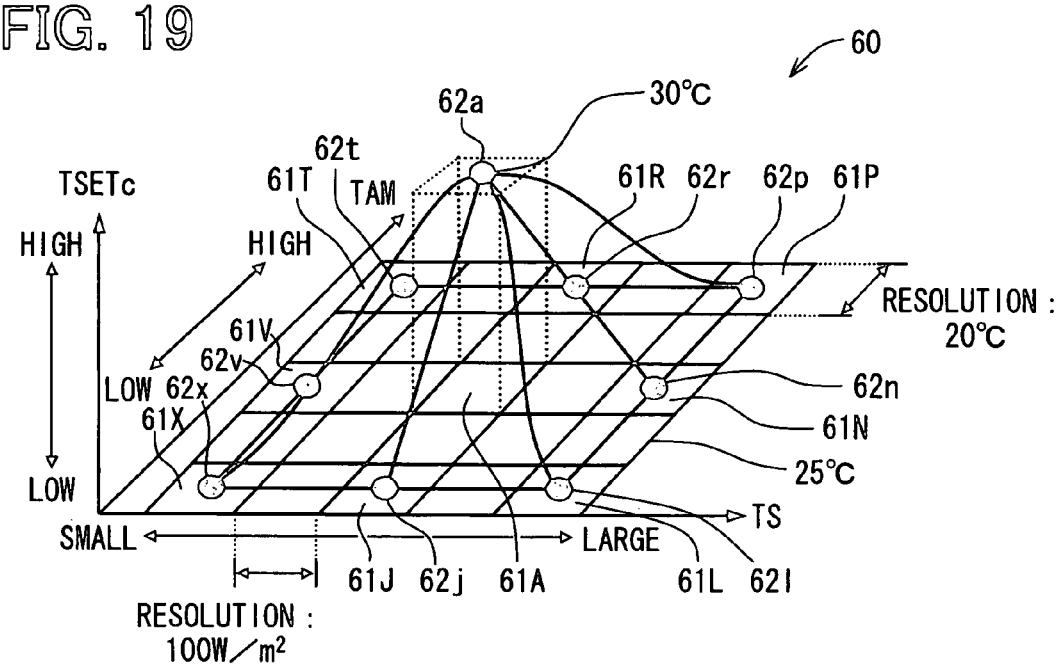
FIG. 19 is a diagram showing a part of a map, for explaining interpolation and calculation of a control set temperature, and storing operation thereof, according to the other embodiment.

In contrast, like the example shown in FIG. 18, when the set temperature at the center point 62*a* is updated to be increased by 5° C. or more, the control set temperature TSETc may be interpolated and calculated four times between the following center points. Specifically, as shown in FIG. 19, the interpolation is performed between the center point 62*a* of the detection area 61A and the center points 62*j*, 62*l*, 62*n* of the areas 61J, 61L, 61N apart from the detection area 61A via the adjacent areas to the detection area 61A. Similarly, the interpolation is performed between the center point 62*a* and the center points 62*n*, 62*p*, 62*r* of the areas 61N, 62P, 62R apart from the detection area 61A, and between the center point 62*a* and the center points 62*r*, 62*t*, 62*v* of the areas 61R, 61T, 61V apart from the detection area 61A. Also, the interpolation is performed between the center point 62*a* and the center points 62*v*, 62*x*, 62*j* of the areas 61V, 61X, 61J apart from the detection area 61A. Thus, the set temperatures for control TSETc on the map may be updated so as to obtain the map 60 in which any control set temperature TSETc in a range surrounded by the center points 62*l*, 62*p*, 62*t*, 62*x* is represented on a smooth curved surface reflecting the learning.

Although in each of the above-mentioned embodiments, the temperature display section 38*a* constantly displays the control set temperature TSETc stored to correspond to the center point 62*a* of the detection area 61A including the detection point 63 of the environmental conditions in units of resolution previously specified, the present invention is not limited thereto. The control set temperature TSETc corresponding to the detection point 63 may be displayed in units of resolution previously specified.

With this arrangement, when the detection point 63 of the environmental conditions changes and thus the control set temperature TSETc changes, the temperature display section 38*a* displays the changing control set temperature TSETc. This enables the passenger to realize the control set temperature TSETc actually used for the air conditioning control, and feel a smooth change in control set temperature TSETc, together with a change in environmental condition.

Even in any case where the temperature display section 38*a* displays the control set temperature TSETc stored to correspond to the center point 62*a* of the detection area 61A including the detection point 63 or where it displays the control set temperature TSETc corresponding to the detection point 63, the display is not limited to units of resolution previously specified.

Although in each of the above embodiments, the temperature display section 38*a* serving as display means receives inputs of temperature information from the microcomputer 31 serving as control means and displays the values of the control set temperatures TSETc, this display section is not limited thereto. The temperature display section may display the temperatures, for example, in different colors. In one specific example, a relatively high control set temperature may be displayed in red, a relatively low temperature in blue, and an intermediate set temperature in color between red and blue, which color is gradually changed according to the temperature.

Announcement means for the control set temperature TSETc is not limited to the display means, such as the temperature display section 38*a*, and may be sound production means including voice or the like. It is noted that the announcement means, including the display means, may not be provided.

Although in the respective embodiments as described above, the interpolation and calculation of the control set temperature TSETc between the center points is performed based on the fuzzy control theory, the interpolation and calculation method is not limited thereto. For example, linear interpolation may be employed. Specifically, a control set temperature TSETc may be calculated on a plane passing through three center points, including the center point 62*a* surrounding the detection point 63 of the environmental condition.

Although in each of the above embodiments, the maps 60, 70, 80 for the control set temperature TSETc are two-dimensional maps having the outside air temperature TAM and the amount of solar radiation TS on the axes among the environmental conditions associated with air conditioning, the map may be one having other environmental conditions on the axes. For example, an inside air temperature TR, a surface temperature of the passenger detected by an IR sensor or the like, a humidity RH in the vehicle compartment detected by a humidity sensor, and the like may be used on the axes, in addition to the outside air temperature TAM and the amount of solar radiation TS. The map for the control set temperature TSETc may be a three- or more dimensional map.

In each embodiment described above, the control set temperature TSETc corresponding to the center point 62 is stored in each of the plural areas 61 partitioned on the map, but is not limited thereto. The control set temperature TSETc may be stored to correspond to a predetermined point previously set one by one in each of the plural areas 61.

Although in each of the above embodiments, the axes of the outside air temperature TAM and the amount of solar radiation TS on the map are respectively partitioned at equal intervals into the plural areas 61, the intervals of the areas partitioned may not be equal. That is, the sizes of the plural areas 61 may not be uniform. When the size of the area is changed, the stricter the environmental condition to the passenger is, the larger the interval for partitioning the axis of the environmental condition is, that is, preferably, the larger the size of the area is.

In each embodiment as described above, the stand-by RAM 31*a* includes three maps 60, 70, 80 corresponding to three pre-registered persons who are going to ride in the vehicle, but is not limited thereto. The stand-by RAM 31*a* may have maps for two or more persons who are going to ride in the vehicle, and may use the appropriate map corresponding to the riding passenger. It is noted that even when the air conditioner system is provided with only one map for the control set temperature TSET, the present invention can be applied effectively to this system.

Although in each of the above-mentioned embodiments the stand-by RAM is used as storage means, the present invention is not limited thereto. Any other storage element may be used.

The resolution of the outside air temperature TAM is 20° C., the resolution (the resolving power) of the solar radiation amount TS is 100 W/m$^2$, and the initial value of the set temperature TSET is 25° C. or the like, which are exemplary real values in the above-mentioned embodiments, but may be appropriately changed and set.

The present invention can be suitably used for any vehicle air conditioner in which a storage means previously defines a predetermined point in each of plural areas formed on the multi-dimensional map which handles the values of plural environmental conditions associated with air conditioning in the vehicle compartment as variables, and stores a control set temperature as a value corresponding to the predetermined point. In the vehicle air conditioner, when the passenger changes a passenger set temperature, the storage means updates the value of the control set temperature corresponding to the predetermined point of the area including the detected values of the environmental conditions at a time of the changing operation to a changed value of the passenger set temperature. The storage means stores therein the value of the updated temperature, and learns the control set temperature.

In the air conditioning of the vehicle compartment by control means, when the detected value (detection point) of each of the plural environmental conditions is not identical to the predetermined point of any one of the areas on the map, the control means can control the air-conditioning state in the vehicle compartment as follows. The control means interpolates and calculates a control set temperature corresponding to the detected values of the plural environmental conditions from the control set temperature stored in the predetermined point of the area including the detected values of the plural environmental conditions, and the control set temperature stored in the predetermined point of a surrounding area. The control means then controls the air-conditioning state based on the interpolated and calculated set temperature.

Such changes and modifications are to be understood as being within the scope of the present invention as defined by the appended claims.

What is claimed is:

1. An air conditioner for a vehicle, for controlling an air conditioning state in a vehicle compartment, comprising:
   means for changing a passenger set temperature in a vehicle compartment to a value desired by a passenger;
   means for partitioning values of a plurality of environmental conditions associated with air conditioning in the vehicle compartment into predetermined ranges thereby to form a plurality of areas on a multi-dimensional map which handles the values of the plurality of environmental conditions as variables, the partitioning means being adapted for previously defining one point on the map in each area, as a predetermined point, and for storing therein a control set temperature as a value corresponding to the predetermined point;
   means for specifying a point on the map defined by detected values of the plurality of environmental conditions, as a detection point for the environmental conditions;
   means for extracting an area including the detection point as a detection area from the plurality of areas; and
   means for controlling the air-conditioning state in the vehicle compartment using the control set temperature stored in the partitioning means, wherein
   when the passenger set temperature is changed by operating the changing means, the partitioning means updates a value of the control set temperature corresponding to the predetermined point of the detection area at a time of the changing operation to a value of the changed passenger set temperature, and stores therein the value of the updated temperature,
   when the detection point is not any one of the predetermined points, the controlling means interpolates and calculates a control set temperature corresponding to the detection point from the control set temperature stored in the predetermined point of the detection area and the control set temperature stored in the predetermined point of a surrounding area around the detection area, and then controls the air-conditioning state in the vehicle compartment based on the interpolated and calculated control set temperature; and
   one of the plurality of areas is disposed between the surrounding area and the detection area.

2. The air conditioner according to claim 1, wherein
   when the detection point is not any one of the predetermined points, the controlling means interpolates and calculates the control set temperature corresponding to the detection point in every control process cycle for controlling the air-conditioning state in the vehicle compartment thereby to control the air-conditioning state in the vehicle compartment.

3. The air conditioner according to claim 1, wherein
   the partitioning means stores the controlling set temperature interpolated and calculated by the controlling means on the map, and
   the controlling means controls the air-conditioning state in the vehicle compartment based on the control set temperature corresponding to the detection point on the map stored in the partitioning means when controlling the air-conditioning state in the compartment.

4. The air conditioner according to claim 1, wherein the plurality of environmental conditions are two environmental conditions.

5. The air conditioner according to claim 4, wherein the two environmental conditions are an outside air temperature which is a temperature of air outside the vehicle compartment, and an amount of solar radiation received in the vehicle compartment.

6. The air conditioner according to claim 1, wherein the predetermined point is a center point obtained by combination of respective center values of the plurality of environmental conditions in the area.

7. The air conditioner according to claim 1, wherein the controlling means performs interpolation and calculation based on fuzzy control theory.

8. The air conditioner according to claim 1, further comprising means for identifying a passenger riding in the vehicle compartment from pre-registered persons who are going to ride therein, wherein
   the partitioning means includes the maps corresponding to the respective persons who are going to ride, and
   the controlling means controls the air-conditioning state in the vehicle compartment using the control set temperature of the map corresponding to the passenger identified by the identifying means.

9. The air conditioner according to claim 1, further comprising means for receiving input of temperature information output from the controlling means and for displaying a temperature,
   wherein the controlling means outputs the control set temperature stored in the predetermined point of the detection area as the temperature information to the receiving means.

10. The air conditioner according to claim 9, wherein the controlling means outputs the value of the control set temperature stored in the predetermined point of the detection area as the temperature information to the receiving means in units of resolution previously specified.

11. The air conditioner according to claim 1, further comprising means for receiving input of temperature information output from the controlling means and for displaying temperature,
   wherein the controlling means outputs the control set temperature corresponding to the detection point as the temperature information to the receiving means.

12. The air conditioner according to claim 11, wherein the controlling means outputs a value of the control set temperature corresponding to the detection point as the temperature information to the receiving means in units of resolution previously specified.

13. The air conditioner according to claim 1, wherein when the detection point is not any one of the predetermined points, the controlling means interpolates and calculates a control set temperature corresponding to the detection point from the control set temperature stored in the predetermined point of the detection area and the control set temperatures stored in the predetermined points of three surrounding areas, the detection point is surrounded by the predetermined point of the detection area and the predetermined points of the three surrounding areas, the controlling means controls the air-conditioning state in the vehicle compartment based on the interpolated and calculated control set temperature; and one of the plurality of areas is disposed between the detection area and each of the three surrounding areas.

14. The air conditioner according to claim 13, wherein the predetermined point is a center point obtained by combination of respective center values of the plurality of environmental conditions in the area.

15. The air conditioner according to claim 13, wherein one of the plurality of areas is disposed between a first one and a second one of the three surrounding areas.

16. The air conditioner according to claim 15 wherein one of the plurality of areas is disposed between the second one and a third one of the three surrounding areas.

* * * * *